United States Patent
Tanaka et al.

(10) Patent No.: US 8,292,512 B2
(45) Date of Patent: Oct. 23, 2012

(54) BALL BEARING AND SUPPORTING CONSTRUCTION

(75) Inventors: Susumu Tanaka, Kanagawa (JP); Yoshiaki Sakajiri, Kanagawa (JP); Yuuki Tsuchida, Kanagawa (JP)

(73) Assignee: NSK Ltd., Tokyo (JP)

( * ) Notice: Subject to any disclaimer, the term of this patent is extended or adjusted under 35 U.S.C. 154(b) by 1243 days.

(21) Appl. No.: 12/021,424

(22) Filed: Jan. 29, 2008

(65) Prior Publication Data

US 2008/0187261 A1 Aug. 7, 2008

(30) Foreign Application Priority Data

Jan. 29, 2007 (JP) .............................. P. 2007-018237
Jan. 29, 2007 (JP) .............................. P. 2007-018440
Jan. 30, 2007 (JP) .............................. P. 2007-019764

(51) Int. Cl.
*F16C 33/41* (2006.01)
*F16C 33/44* (2006.01)

(52) U.S. Cl. ........ 384/531; 384/523; 384/526; 384/572; 384/470

(58) Field of Classification Search ................. 384/492, 384/470, 523, 531–532, 527, 534, 572, 521, 384/526

See application file for complete search history.

(56) References Cited

U.S. PATENT DOCUMENTS

| | | | | |
|---|---|---|---|---|
| 4,133,588 A | * | 1/1979 | Earsley | 384/470 |
| 5,015,105 A | * | 5/1991 | Ueno | 384/531 |
| 5,352,047 A | * | 10/1994 | Ingall et al. | 384/572 |
| 5,522,667 A | * | 6/1996 | Miyake | 384/492 |
| 5,539,844 A | * | 7/1996 | Tazumi et al. | 384/531 |
| 5,575,569 A | * | 11/1996 | Shinohara | 384/470 |
| 5,988,891 A | * | 11/1999 | Yamamoto et al. | 384/463 |
| 6,371,655 B1 | * | 4/2002 | Fierling | 384/523 |
| 6,402,386 B1 | * | 6/2002 | Daikuhara | 384/470 |
| 6,661,143 B1 | | 12/2003 | Ohura | |
| 6,890,105 B2 | * | 5/2005 | Ide et al. | 384/470 |
| 7,070,333 B2 | * | 7/2006 | Ito et al. | 384/473 |
| 7,114,852 B2 | * | 10/2006 | Compassi | 384/470 |
| 2002/0051595 A1 | | 5/2002 | Goto et al. | |
| 2002/0102040 A1 | * | 8/2002 | Koiwa et al. | 384/474 |
| 2005/0196086 A1 | * | 9/2005 | Terada et al. | 384/523 |

FOREIGN PATENT DOCUMENTS

| | | |
|---|---|---|
| DE | 1892455 U | 5/1964 |
| DE | 1913905 U | 4/1965 |
| DE | 10325585 A1 | 1/2004 |
| DE | 10353098 A1 | 5/2004 |

(Continued)

OTHER PUBLICATIONS

German Office Communication dated Nov. 10, 2009.

(Continued)

*Primary Examiner* — Marcus Charles
(74) *Attorney, Agent, or Firm* — Sughrue Mion, PLLC

(57) ABSTRACT

A ball bearing has an inner ring fitted on a rotational shaft and including an inner ring raceway on an outer circumferential surface thereof, an outer ring including an outer ring raceway on an inner circumferential surface thereof, a plurality of balls rotatably provided between the inner ring raceway and the outer ring raceway and a crown resin cage for retaining the balls at equal intervals in a circumferential direction. A bore diameter of the inner ring is 100 mm or more, and a radial clearance resulting in a state that the inner ring is assembled to the rotational shaft is 20 μm or more.

12 Claims, 17 Drawing Sheets

FOREIGN PATENT DOCUMENTS

| | | | |
|---|---|---|---|
| EP | 1479950 | A1 | 11/2004 |
| GB | 1309787 | A | 3/1973 |
| JP | 56-49315 | U | 5/1981 |
| JP | 4-1726 | U | 1/1992 |
| JP | 5-96548 UM | | 4/1993 |
| JP | 628345 | U | 4/1994 |
| JP | 6-165790 | A | 6/1994 |
| JP | 9088968 | A | 3/1997 |
| JP | 11-072195 | A * | 3/1999 |
| JP | 2000130177 | A * | 5/2000 |
| JP | 2000145794 | A | 5/2000 |
| JP | 2000145815 | A | 5/2000 |
| JP | 2002-122151 | A | 4/2002 |
| JP | 2002122147 | A | 4/2002 |
| JP | 2003-49837 | A | 2/2003 |
| JP | 2003278764 | A * | 10/2003 |
| JP | 200492719 | A | 3/2004 |
| JP | 2004-239443 | A | 8/2004 |
| JP | 2005-90692 | A | 4/2005 |
| JP | 2005163943 | A | 6/2005 |
| JP | 2005299716 | A | 10/2005 |
| JP | 2005337426 | A | 12/2005 |
| JP | 20069887 | A | 1/2006 |
| JP | 2006-292046 | A | 10/2006 |
| JP | 2007263280 | A * | 10/2007 |

OTHER PUBLICATIONS

Office Action dated Jun. 1, 2011 from the Japanese Patent Office in counterpart Japanese application No. 2007-018237.
Office Action dated Jun. 1, 2011 from the Japanese Patent Office in counterpart Japanese application No. 2007-018440.
Office Action dated Jun. 1, 2011 from the Japanese Patent Office in counterpart Japanese application No. 2007-019764.
Notification of Reason for Refusal issued Sep. 6, 2011 from the Japanese Patent Office in counterpart Japanese application No. 2010-159006.
Office Action issued on Jan. 31, 2012 by the Japanese Patent Office in the corresponding Japanese Patent Application No. 2010-159006.
Office Action issued on Jan. 24, 2012 by the Japanese Patent Office in the counterpart Japanese Patent Application No. 2007-018440.

* cited by examiner

BALL BEARING AND SUPPORTING CONSTRUCTION

BACKGROUND OF THE INVENTION

1. Field of the Invention

The present invention relates to a ball bearing and a supporting construction therefor, and more particularly to a ball bearing for use in an automotive transmission or the like in which lubricating oil is fed from an axial direction for forcibly lubricating the ball bearing and a supporting construction therefor.

2. Description of Related Art

Ball bearings are assembled to an automotive transmission in which lubricating oil is fed from an axial direction for forcible lubrication.

Conventionally, there has been known a ball bearing having a cage which includes: an annular portion; pillar portions which extend in the axial direction from a plurality of circumferential locations of the annular portion and which form pocket portions for retaining balls as rolling elements therebetween; and an inclined portion which is inclined in the axial direction so as to constitute a small diameter at an axially central side thereof is formed on an inner circumferential surface of the annular portion and which extends substantially over the full width thereof (for example, JP-A-2005-90692).

In addition, as the conventional forcibly lubricated ball bearing, there has also been known a ball bearing in which balls are retained at intervals between an outer ring and an inner ring by a cage so as to be interposed rotatably between the outer ring and the inner ring, and the cage is a machined cage which is formed by cutting a ring material and in which one axial end face is formed larger in outside diameter than the other axial end face and an outer circumferential surface is formed into a tapered surface which is downwardly inclined from the one axial end face towards the other axial end face (For example, JP-UM-A-5-96548).

In addition, in the ball bearings built in a device of a vehicle such as a motor vehicle, a radial clearance resulting in a state that the ball bearings are built in the device is set to 20 μm or less from the viewpoints of rigidity, vibration and life (for example, JP-A-2003-49837).

The ball bearing disclosed in the above patent application is a pulley unit ball bearing which is built in a pulley unit of a motor vehicle and in which a rotational shaft of a pulley is fittingly inserted in an inner ring thereof, and a radial clearance resulting in a state that the ball bearing is built in the device is set to be in the range of −10 μm to 7 μm.

Incidentally, in conjunction with the recent tendency that more and more attentions are paid to environmental issues, there is an increasing demand for reduction in torque required to rotate a ball bearing which makes up a transmission of a motor vehicle.

In the ball bearings described in the patent application documents referred to above, however, since the lubricating oil is allowed to flow smoothly into the bearing by forming the inclined surface on the inner circumferential surface of the outer circumferential surface of the cage, the lubricating oil tends to flow into the bearing more than required. As a result, the drag torque is increased by virtue of the resistance of the lubricating oil that so flowed into the bearing, and the dynamic frictional torque of the bearing is increased by the drag torque so increased, which constitutes a barrier to enhancement in transmission efficiency of the transmission of the vehicle.

On the other hand, in the event that the feeding amount of lubricating oil is reduced in order to reduce the drag torque caused by the resistance of the lubricating oil, there is caused a fear that the thickness of a lubricating oil film becomes insufficient to thereby reduce the life of the bearing, and in the worst case, there is a concern that seizing of the bearing is generated. In addition, in a case where a lubricating oil feeding path is shared by the ball bearing and other peripheral parts, the effect resulting from reducing the feeding amount of lubricating oil is propagated to the peripheral parts, causing a possibility that the feeding of lubricating oil becomes so insufficient that the lubrication of the peripheral parts is badly affected. In addition, in the event that a crown cage is used as the cage, there is caused a problem that the lubricating oil fed to the bearing is agitated largely by not only the balls but also tabs to thereby increase the oil agitation loss.

In addition, in the ball bearing including the crown cage, pairs of tab portions which are formed on an axial end face of the crown cage agitate lubricating oil which flows into the bearing, whereby the oil agitation loss of the bearing is increased.

SUMMARY OF THE INVENTION

The invention has been made with a view to solving the drawbacks and an object thereof is to provide a ball bearing which can reduce the dynamic torque of the bearing by reducing the drag torque of the bearing and hence can realize an enhancement in transmission coefficient of a transmission of a vehicle and a supporting construction therefor.

In addition, there exists an increasing demand for enhancement in fuel economy of vehicles such as motor vehicles, and in conjunction with such a demand, there is an increasing demand for reduction in torque required to rotate a ball bearing which is built in a device of the motor vehicle. Here, the rotational shaft of the transmission is made up of a plurality of shafts which are overlapped, and the bore diameter of the bearing into which the shafts are fittingly inserted is increased and typically reaches 100 mm or more.

In the ball bearing whose bore diameter becomes 100 mm or more, in the event that the radial residual clearance resulting in a state that the bearing is built in the device is set to 20 μm or less, the ball bearing having such a large bore diameter particularly tends to be subjected to thermal expansion, and depending upon the driving conditions, there has been a fear that the radial clearance becomes too small to prevent the increase in torque.

Additionally, in the ball bearing whose bore diameter becomes 100 mm or more, although an wave-shape pressed-steel cage is generally used which has spherical pockets of which shape is resemble to the balls, the balls and the cage are brought into contact with each other to thereby cause a fear that problems are caused that friction and wear are produced to increase frictional drag, and furthermore that the rotational performance at high speeds is reduced and skidding is produced.

The invention has been made in view of the problems that have been described above, and an object thereof is to provide a ball bearing having a bore diameter of 100 mm or more and adapted to realize a reduction in torque.

Means for Solving the Problem

According to a first aspect of the invention, there is provided a ball bearing including:

an inner ring fitted on a rotational shaft and including an inner ring raceway on an outer circumferential surface thereof;

an outer ring including an outer ring raceway on an inner circumferential surface thereof;

a plurality of balls rotatably provided between the inner ring raceway and the outer ring raceway; and a crown resin cage for retaining the balls at equal intervals in a circumferential direction; wherein a bore diameter of the inner ring is 100 mm or more, and a radial clearance resulting in a state that the inner ring is assembled to the rotational shaft is 20 μn or more.

According to a second aspect of the invention, there is provided the ball bearing according to the first aspect of the invention, wherein lubricating oil is fed from an axial direction to the ball bearing so that the ball bearing is forcibly lubricated, and the crown cage includes:

an annular rim portion;

a plurality of pillar portions disposed on an axial end face of the rim portion at predetermined intervals in the circumferential direction; and pockets formed between the pillar portions for retaining the balls rotatably, wherein the rim portion of the crown cage is disposed on a flow-in-side from which the lubricating oil flows thereinto.

According to a third aspect of the invention, there is provided the ball bearing according to the second aspect of the invention, wherein the other axial end face of the rim portion of the crown cage is formed flat.

According to a fourth aspect of the invention, there is provided the ball bearing according to the first aspect of the invention, wherein lubricating oil is fed from an axial direction to the ball bearing so that the ball bearing is forcibly lubricated, a shield plate is provided to a side of the ball and between the inner ring and the outer ring, and the shield plate is disposed on an upstream side of the ball in a lubricating oil feeding direction.

According to a fifth aspect of the invention, there is provided the ball bearing according to the fourth aspect of the invention, wherein the crown cage has an annular rim portion and pockets for rotatably retain the balls, and the annular rim portion is disposed on a downstream side relative to the balls in the lubricating oil feeding direction.

According to a sixth aspect of the invention, there is provided the ball bearing according to the second aspect of the invention, wherein raised portions are provided between the adjacent pockets on the crown cage along the circumferential direction so as to project towards one axial end portion of the crown cage.

According to a seventh aspect of the invention, there is provided a ball baring according to the fifth aspect of the invention, wherein raised portions are provided between the adjacent pockets on the crown cage along the circumferential direction so as to project towards one axial end portion of the crown cage.

According to an eighth aspect of the invention, there is provided the ball bearing according to the sixth aspect of the invention, wherein a distance between the balls retained in the adjacent pockets is twice or more of a ball diameter Da.

According to a ninth aspect of the invention, there is provided the ball bearing according to the seventh aspect of the invention, wherein a distance between the balls retained in the adjacent pockets is twice or more of a ball diameter Da.

According to a tenth aspect of the invention, there is provided the ball bearing according to the second aspect of the invention, wherein the crown cage is a resin cage molded by a mold including a plurality of gates, and the numbers of pocket portions which are provided respectively between the gates are made to be numbers which are even numbers and which become even or closest to being even According to an eleventh aspect of the invention, there is provided the ball bearing according to the fifth aspect of the invention, wherein the crown cage is a resin cage molded by a mold including a plurality of gates, and the numbers of pocket portions which are provided respectively between the gates are made to be numbers which are even numbers and which become even or closest to being even.

According to a twelfth aspect of the invention, there is provided the ball bearing according to the second aspect of the invention, wherein the crown cage is a resin cage molded by a mold including a plurality of gates and at least one basin, a total number of pockets is made to be an odd number and the numbers of pockets disposed respectively between the gates are made to be numbers which become closest to being even, and the basin is positioned in either of pillar portions formed in both end portions of a pocket located in a circumferential center between the gates between which an odd number of pockets are provided.

According to a thirteenth aspect of the invention, there is provided the ball bearing according to the fifth aspect of the invention, wherein the crown cage is a resin cage molded by a mold including a plurality of gates and at least one basin, a total number of pockets is made to be a number which is an odd number and which enables the number of pockets disposed between the gates to become most equal, and the basin is positioned in either of pillar portions formed in both end portions of a pocket located in a circumferential center between the gates between which an odd number of pockets are provided.

According to a fourteenth aspect of the invention, there is provided a supporting construction including:

a ball bearing to which lubricating oil is fed from an axial direction so that the ball bearing is forcibly lubricated and which supports a rotational shaft on a housing, wherein the ball bearing includes:

an inner ring fitted on the rotational shaft from outside;

an outer ring fitted in the housing from inside;

a plurality of balls rotatably provided between the inner ring raceway and the outer ring raceway; and a crown resin cage for retaining the balls at equal intervals in a circumferential direction, and wherein the crown cage includes:

an annular rim portion;

a plurality of pillar portions disposed on an axial end face of the rim portion at predetermined intervals in the circumferential direction; and pockets formed between the pillar portions for retaining the balls rotatably;

wherein the rim portion of the crown cage is disposed an a flow-in-side from which the lubricating oil flows thereinto.

According to a fifteenth aspect of the invention, there is provided the supporting construction according to the fourteenth aspect of the invention, wherein raised portions are provided between the adjacent pockets on the crown cage along the circumferential direction so as to project towards one axial end portion of the crown cage.

According to a sixteenth aspect of the invention, there is provided the supporting construction according to the fifteenth aspect of the invention, wherein a distance between the balls retained in the adjacent pockets is twice or more of a ball diameter Da.

According to a seventeenth aspect of the invention, there is provided a supporting construction including:

a ball bearing to which lubricating oil is fed from an axial direction so that the ball bearing is forcibly lubricated and which supports a rotational shaft on a housing, wherein the ball bearing includes:

an inner ring fitted on a rotational shaft from outside;

an outer ring fitted in a housing;

a plurality of balls rotatably provided between the inner ring raceway and the outer ring raceway; and a crown resin cage for retaining the balls; and a shield plate provided to a side of the ball and between the inner ring and the outer ring, wherein the shield plate is disposed on an upstream side of the ball in a lubricating oil feeding direction.

According to an eighteenth aspect of the invention, there is provided the supporting construction according to the seventeenth aspect of the invention, wherein the crown cage has an annular rim portion and pockets for rotatably retain the balls; and the annular rim portion is disposed on a downstream side relative to the balls in the lubricating oil feeding direction.

According to a nineteenth aspect of the invention, there is provided the supporting construction according to the eighteenth aspect of the invention, wherein raised portions are provided between the adjacent pockets on the crown cage along the circumferential direction so as to project towards one axial end portion of the crown cage.

According to a twentieth aspect of the invention, there is provided the supporting construction according to the nineteenth aspect of the invention, wherein a distance between the balls retained in the adjacent pockets is twice or more of a ball diameter Da.

According to the ball bearing and the supporting construction of the invention, the crown cage has the annular rim portion, the plurality of pillar portions disposed on the axial end face of the rim portion at predetermined intervals in the circumferential direction, and the pockets formed between the pillar portions for retaining the balls rotatably and the rim portion of the crown cage is disposed on the flow-in-side thereof from which the lubricating oil flows thereinto. Thus, the lubricating oil can be prevented from flowing into the bearing more than required, so that resistance produced by the lubricating oil can be reduced and the oil agitation loss of the bearing can be reduced. Accordingly, since the drag torque of the bearing can be reduced, the dynamic frictional torque of the bearing can be reduced and hence, the enhancement in transmission efficiency of a transmission can be realized.

According to the ball bearing and the supporting construction of the invention, the shield plate which is provided between the inner ring and the outer ring is disposed on the upstream side of the ball in the lubricating oil feeding direction. Thus, a large amount of lubricating oil which is more than required can be prevented from flowing into an interior of the ball bearing, and the drag torque, which is produced by the lubricating oil being agitated by the tab portions of the crown cage and the balls, can be reduced largely. In addition, in the event that lubricating oil feeding path is shared by the ball bearing and other peripheral parts, the feeding amount of lubricating oil which flows into the ball bearing is limited by the shield plate so as to guide the lubricating oil to the peripheral parts. Therefore, it becomes possible to lubricate the peripheral parts sufficiently.

Consequently, the dynamic frictional torque of the ball bearing can be reduced, so that the overall efficiency of a device such as a transmission of a motor vehicle into which the ball bearing is built can be enhanced, thereby making it possible to improve the fuel economy. The reduction of torque loss is effective not only to a small ball bearing but also to a large ball bearing such as one whose bore diameter reaches or exceeds 100 mm.

According to the ball bearing of the invention, since the radial clearance for the ball bearing, whose bore diameter reaches or exceeds 100 mm, is made to be 20 μm or more in a state that the ball bearing is built in the device, the torque of the bearing can be reduced.

In addition, in the event that the cage is made up of the crown cage which is made of a synthetic resin which has a superior self-lubricating capability, the generation of friction and wear resulting from the contact between the balls and the cage can be prevented to reduce the torque of the ball bearing. Furthermore, the rotational performance at high speeds can preferably be secured, thereby making it possible to solve the problem of surface roughening or skidding. In addition, the ball bearing configured as described is suitable for supporting the shaft of the transmission of the vehicle.

In addition, in the ball bearing of the invention, the raised portions are provided between the adjacent pockets on the crown cage along the circumferential direction so as to project towards the one axial end portion of the crown cage. Therefore, compared to the conventional bearing which has the recessed portions which each extend over the whole area between the pockets, the lubricating oil agitation loss by the tabs can be reduced largely, thereby making it possible to reduce largely the lubricating oil agitation loss by the whole cage.

In addition, in the ball bearing of the invention, since the area occupied by the raised portion between the pockets is larger than the area occupied by the pocket in the circumferential direction due to the distance L between the balls being twice or more of the ball diameter Da, the straightening action of lubricating oil by the raised portions is larger in magnitude than the agitation action of lubricating oil by the tabs, thereby making it possible to reduce largely the lubricating oil agitation loss by the whole cage.

According to the ball bearing of the inventions since the lubricating oil agitation loss by the tabs of the cage can be reduced largely in the event that the ball diameter is reduced or the number of balls is reduced, the torque of the bearing can be reduced.

The configuration of the invention is effective when the PCD (Pitch Circle Diameter) of the bearing is large and the number of balls is small.

In addition, the ball bearing of the invention is, for example in a transmission for a vehicle, effective in reducing friction and increasing rotational speed and is preferably used on hybrid vehicles.

According to the resin cage of the invention, since the number of pockets disposed between the gates is made to be the number which is the even number and which becomes equal or most equal, even in the event that the cage has large diameter, a weld line formed in the area between the gates is formed in a position which is offset from a bottom portion of the pocket in the circumferential direction, whereby the rigidity of the cage can be increased and the strength of the cage can be increased. In addition, since areas defined between the gates can be balanced substantially evenly, the molding accuracy of the cage can be increased.

According to the resin cage of the invention, since the total number of pockets is made to be the number which is the odd number and which enables the number of pockets disposed between the gates to become most equal and the basin is positioned in either of the pillar portions formed in both the end portions of the pocket located in the circumferential center between the gates between which the odd number of pockets are provided, even in the event that the cage is a cage in which the total number of pockets is an odd number and which has large diameter, the strength and molding accuracy of the cage can be increased.

DETAILED DESCRIPTION OF THE PREFERRED EMBODIMENTS

Hereinafter, one embodiment of a ball bearing according to the invention will be described in detail by reference to the drawings.

Figure 1:
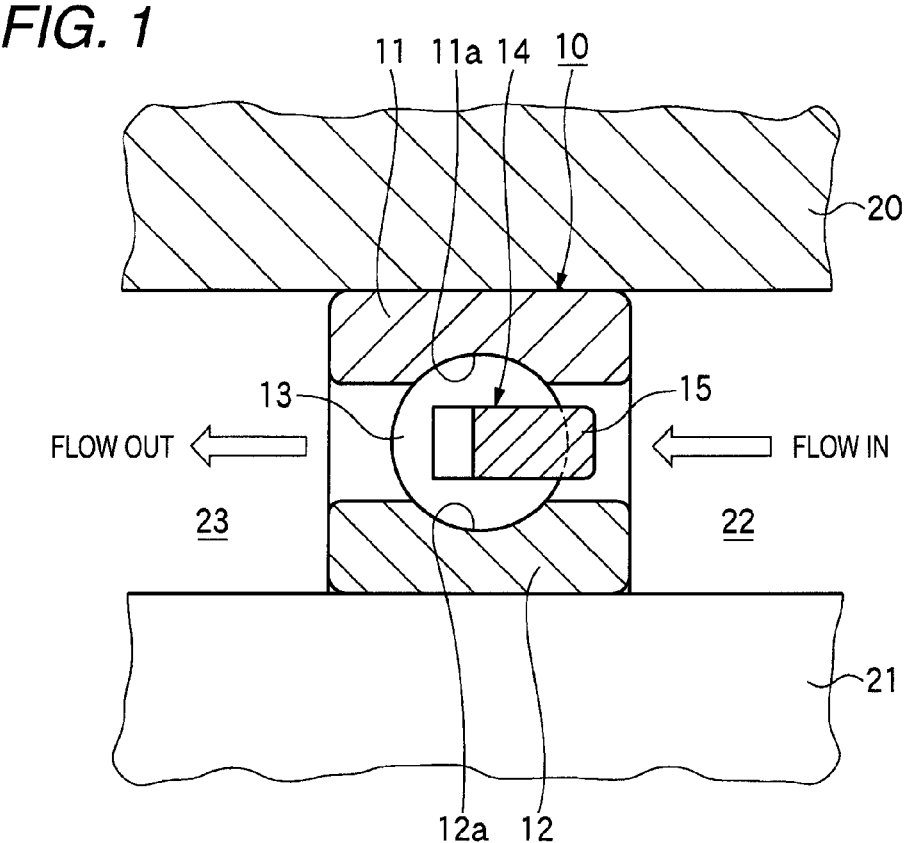
FIG. 1 is a sectional view which illustrates a main part of a ball bearing according to the invention.
Figure 2:
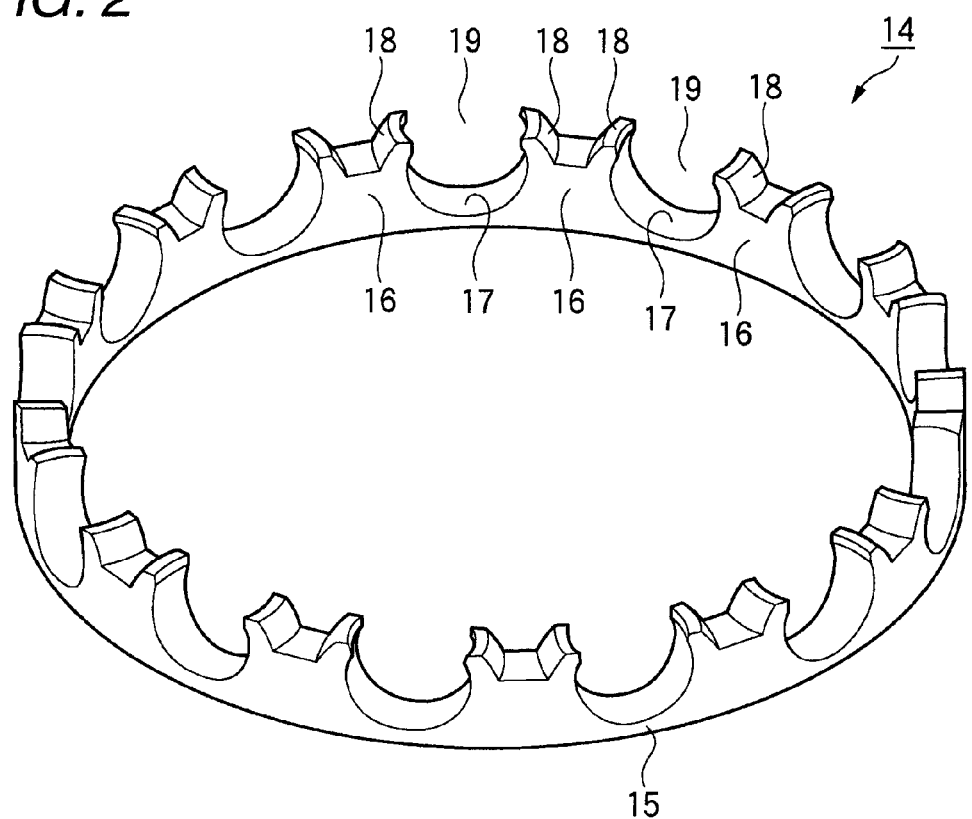
FIG. 2 is a perspective view which illustrates a crown cage shown in FIG. 1.

FIG. 1 is a sectional view which illustrates a main part of a ball bearing according to the invention, and FIG. 2 is a perspective view which illustrates a crown cage shown in FIG. 1.

As shown in FIG. 1, a ball bearing 10 of this embodiment includes an outer ring 11 having an outer ring raceway 11a on an inner circumferential surface thereof, an inner ring 12 having an inner ring raceway 12a on an outer circumferential surface thereof, a plurality of balls 13 which are rotatably provided between the outer ring raceway 11a and the inner ring raceway 12a and a crown cage 14 which retains the balls 13 at equal intervals in a circumferential direction.

The crown cage 14 is integrally formed from a synthetic resin through injection molding. The crown cage 14 includes, as shown in FIG. 2, an annular rim portion 15, a plurality of pillar portions 16 which are disposed on an axial end face of the rim portion 15 at predetermined intervals in the circumferential direction of the rim portion 15, pocket portions 17 which are formed between the pillar portions 16, respectively, so as to lie adjacent to each other for rotatably retaining the plurality of balls 13 at predetermined intervals in the circumferential direction of the rim portion 15, pairs of tab portions 18 which are each formed at circumferential end portions of an inner circumferential surface of each pocket portion 17 and openings 19 which are each formed between distal ends of the pair of tab portions 18. In addition, by pushing forcibly the ball into the pocket portion 17 from the opening 19 while forcibly expanding a space between the pair of tab portions 18, the ball 13 is rotatably retained within the pocket portion 17 via a minute clearance formed therebetween. Additionally in this embodiment, the other axial end face of the rim portion 15 of the crown cage 14 is formed flat, and no irregularity is formed at all on the end face concerned.

As the resin material of the crown cage 14, there can be raised polyamide-based resins such as nylon 46 and nylon 66, polybutylene terephthalate, polyphenylene sulfide (PPS), polyamide (PAI), thermoplastic polyimide, polyether ether ketone (PEEK), polyether nitrile (PEN) and the like. In addition, the rigidity and dimension accuracy of the crown cage 14 can be improved by adding as required 10 to 50 wt % of a fibrous filler (for example, glass fiber, carbon fiber and the like) to these resins. (In addition, since it is made of synthetic resin, the crown cage 14 has superior self-lubricating capability and low friction property, and therefore, the cage concerned is effective in reducing friction torque loss. In addition, no wear dust is generated which would otherwise be generated by virtue of sliding contact between the cage and the balls 13 which would occur with a metallic cage such as a wave-shape cage, and therefore, the lubricating performance is never reduced.

In addition, in this embodiment, as shown in FIG. 1, the ball bearing 10 is built into a device such as a transmission of a motor vehicle by fitting the outer ring 11 in a housing 20 and fitting the inner ring 12 on a rotational shaft 21 so that the rim portion 15 of the crown cage 14 is disposed on a side of the bearing 10 from which lubricating oil flows in. As this occurs, a space between the housing 20 and the rotational shaft 21 constitutes a feeding path 22 and a discharge path 23, and lubricating oil is fed into the ball bearing 10 from an axial direction for forcible lubrication.

In the ball bearing 10 configured as has been described above, when lubricating oil is fed to an axial side (the right-hand side as viewed in FIG. 1), although the lubricating oil flows into the ball bearing 10 from between the outer ring 11 and the inner ring 12, as this occurs, since the rim portion 15 of the crown cage 14 prevents the lubricating oil from flowing into the ball bearing 10 more than required, the resistance by the lubricating oil is reduced and the amount of lubricating oil that is agitated by the pairs of tab portions 18 of the crown cage 14 and the balls 13 is limited. Thus, the oil agitation loss of the bearing 10 is reduced. Therefore, since the drag torque of the bearing 10 is reduced, the dynamic frictional torque of the bearing 10 is reduced. In addition, reducing dynamic frictional torque is effective not only to a small ball bearing but also to a large ball bearing such as one whose bore diameter exceeds 100 mm.

In addition, in the ball bearing 10, since the other axial end face of the rim portion 15 of the crown cage 14 is formed flat, even though the lubricating oil comes into contact with the rim portion 15 when it flows into the ball bearing 10, the lubricating oil is agitated in no case, and therefore, there is no case where the oil agitation loss of the bearing 10 is increased.

As has been described heretofore, according to the ball bearing 10 of the embodiment, the crown cage 14 includes the annular rim portion 15, the plurality of pillar portions 16 which are disposed on the axial end face of the rim portion 15 at predetermined intervals in the circumferential direction of the rim portion 15 and the pocket portions 17 which are formed between the pillar portions 16 for rotatably retaining the plurality of balls 13. In addition, the rim portion 15 of the crown cage 14 is disposed on the flow-in-side of the bearing 10 from which the lubricating oil flows thereinto. Therefore, the lubricating oil can be prevented from flowing into the bearing 10 more than required, whereby not only can the resistance by the lubricating oil be reduced but also the oil agitation loss of the bearing 10 can be reduced. Accordingly, since the drag torque of the bearing 10 can be reduced, the dynamic frictional torque of the bearing 10 can be reduced, and hence, the increase in transmission efficiency of the transmission can be attained.

In addition, according to the ball bearing 10 of the embodiment, since the other axial end face of the rim portion 15 of the crown cage 14 is formed flat, even though the lubricating oil which has flowed into the rim portion when the bearing rotates comes into contact with the rim portion 15, the oil agitation loss of the bearing 10 is not increased. Thus, since the increase in drag torque of the bearing 10 can be reduced, the dynamic frictional torque of the bearing 10 can further be reduced.

EXAMPLE

Hereinafter, a rotational test will be described which was carried out to verify the function and advantage of the ball bearing 10 of the invention (the embodiment of the invention).

Figure 3:
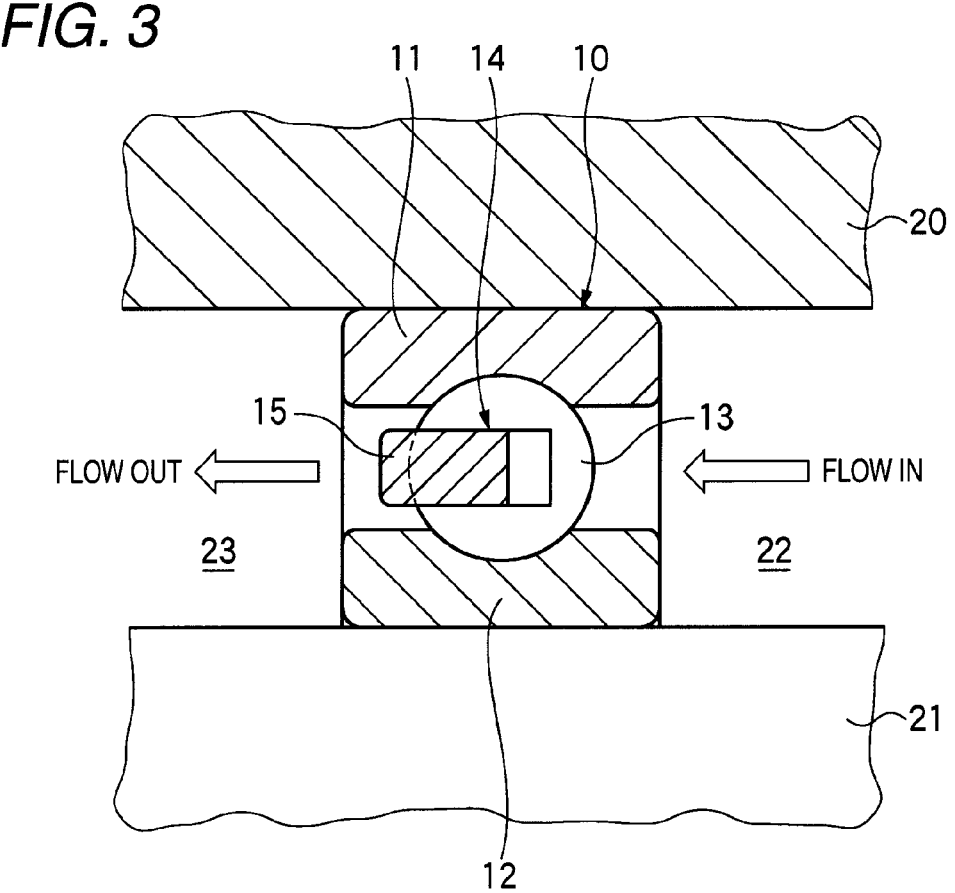
FIG. 3 is a sectional view which illustrates a main part of a ball bearing according to a comparison example which was used in a rotation test.

A standard deep groove ball bearing (JIS bearing number 6826, bore diameter φ130 mm×outside diameter φ165 mm×width 18 mm, PCD 147.5 mm) was used for ball bearings of the embodiment and a comparison example which were used in the test, and in the ball bearing of the embodiment of the invention, as shown in FIG. 1, a rim portion 15 of a crown cage 14 was disposed on a flow-in-side of the bearing from which lubricating oil flows thereinto, and in the comparison example, as shown in FIG. 3, a rim portion 15 was disposed on a flow-out-side from which lubricating oil flows thereout.

In this test, a ball bearing according to the embodiment of the invention and a ball bearing according to the comparison example were prepared, and the ball bearings were rotated under the following test conditions for measurement of a relationship between oil feeding amount and dynamic frictional torque. The results of the test are shown in FIG. 4.

The test conditions were as follows:
Rotation speed: 3,000 rpm
Loads: radial load 300 N, axial load 300 N
Lubricating oil: automotive ATF
Lubrication method: forcible lubrication oil feeding
Feeding oil temperature: 50° C.

Figure 4:
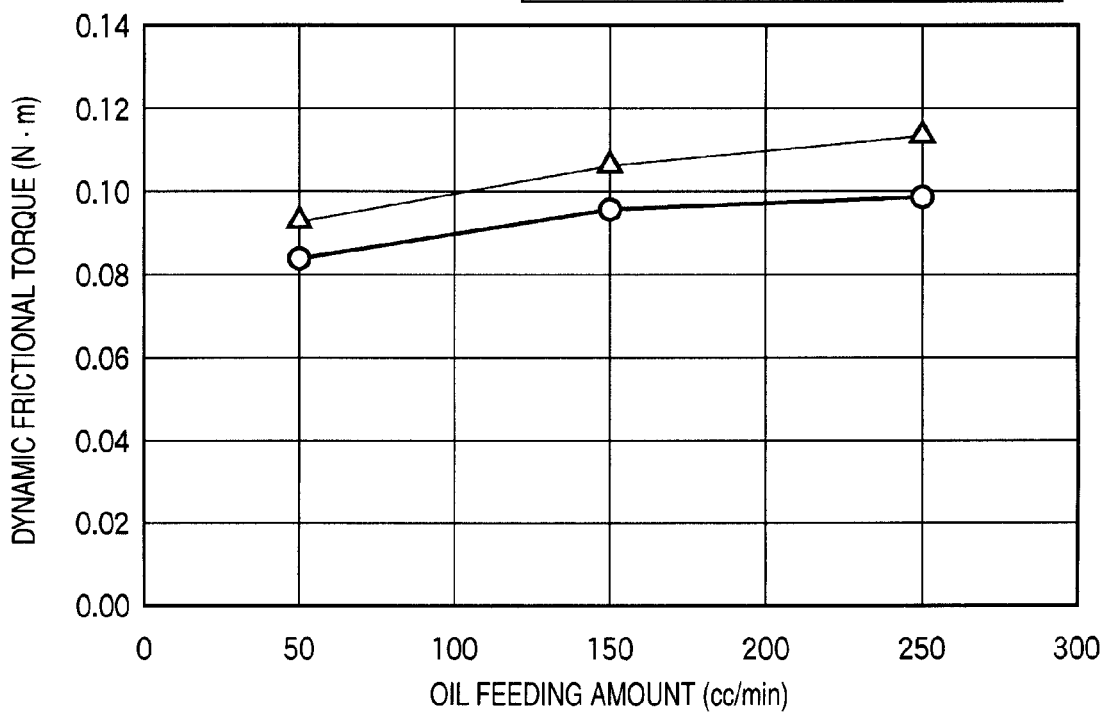
FIG. 4 is a graph showing relationships between oil feeding amount and dynamic frictional torque according to an embodiment of the invention and the comparison example.

As is obvious from FIG. 4, it has been found that the ball bearing according to the embodiment of the invention exhibited a smaller dynamic frictional torque than that of the ball bearing according to the comparison example throughout oil filling amounts. It has been found from this fact that with the ball bearing according to the embodiment of the invention, the drag torque of the bearing could be reduced so that the dynamic frictional torque of the bearing could be reduced, compared with the comparison example in which the rim portion was disposed on the side of the bearing from which the lubricating oil flows thereout.

Furthermore, since the rim portion of the crown cage is disposed on the upstream side relative to the balls as viewed in the lubricating oil filling direction, the torque loss due to agitation of lubricating oil can further be reduced.

Next, another embodiment of a ball bearing according to the invention will be described in detail based on the drawings.

Figure 5:
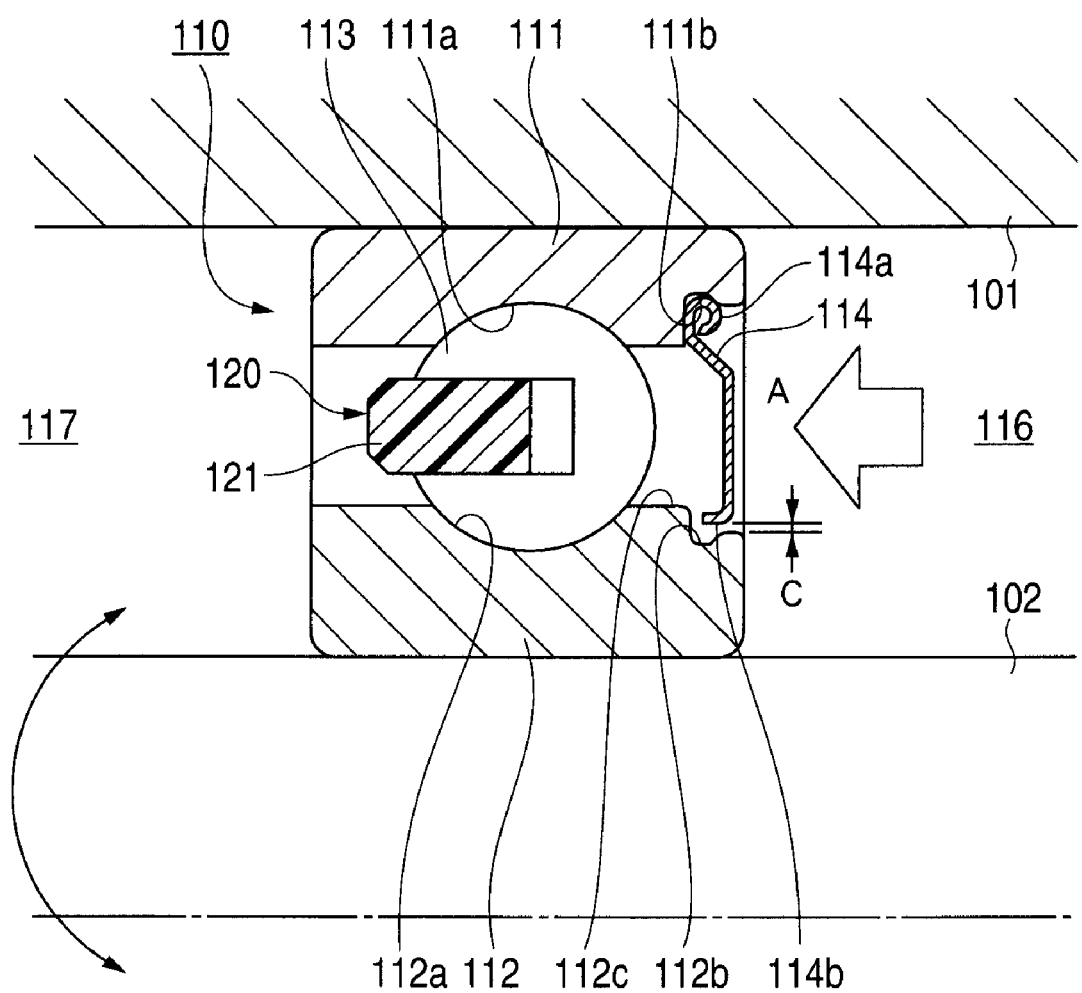
FIG. 5 is a sectional view of a half of a ball bearing according to another embodiment of the invention.

As shown in FIG. 5, a ball bearing 110 includes an outer ring 111 having an outer ring raceway 111a on an inner circumferential surface thereof, an inner ring 112 having an inner ring raceway 112a on an outer circumferential surface thereof, a plurality of balls 113 rotatably provided between the outer ring raceway 111a and the inner ring raceway 112a, a synthetic resin crown cage 120 which is guided by the balls 113 and is provided between the inner circumferential surface of the outer ring 111 and the outer circumferential surface of the inner ring 112 for rotatably retaining the plurality of balls 113 and a metallic shield plate 114 which is fixed in a groove 111b provided on the inner circumferential surface of the outer ring 111 at an axial end portion thereof.

Figure 6:
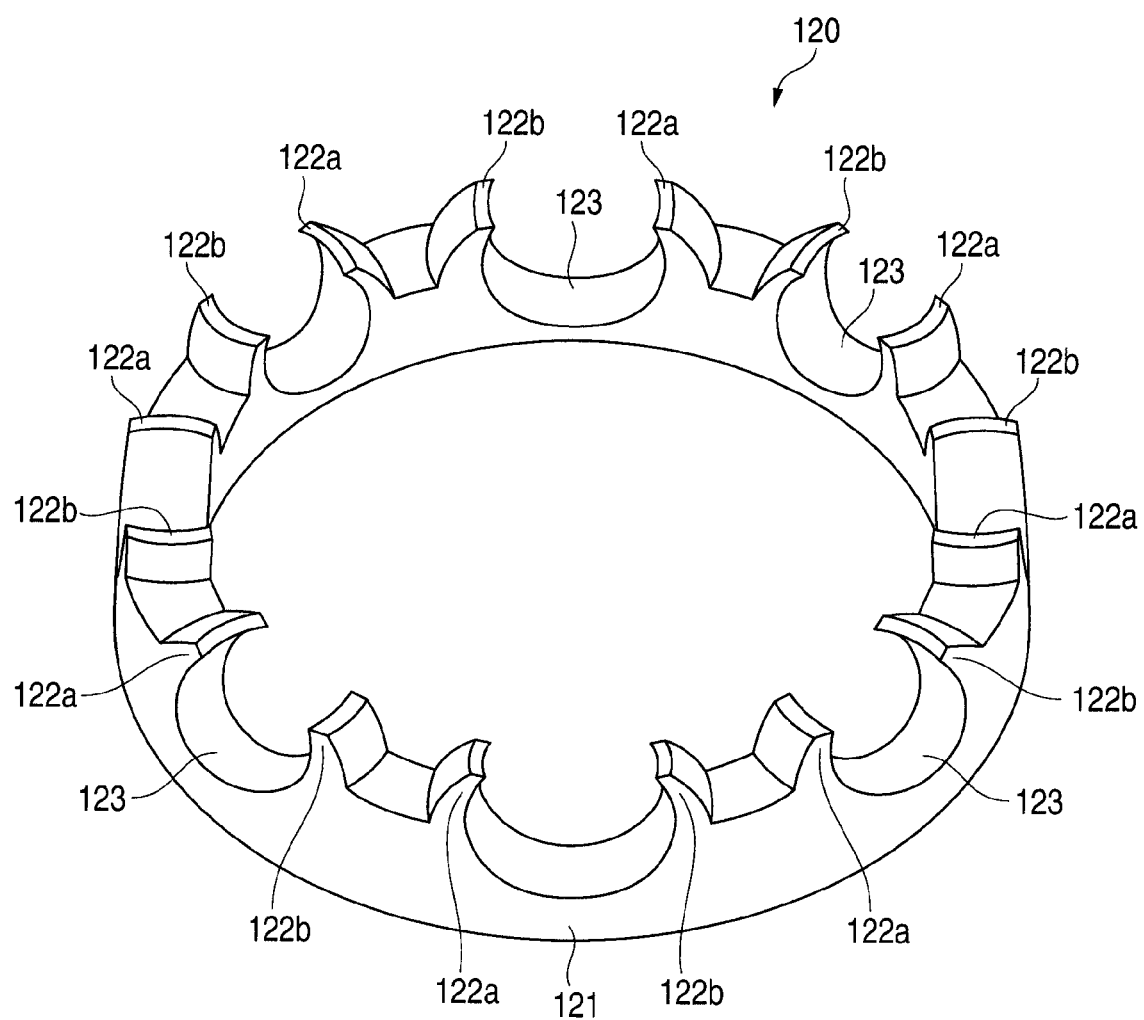
FIG. 6 is a perspective view of a resin crown cage shown in FIG. 5.

The crown cage 120 includes, as shown in FIG. 6, an annular rim portion 121 and a plurality of tab portions 122a, 122b which are provided on the rim portion 121 at intervals in a circumferential direction of the rim portion 121 so as to project therefrom towards an axial side thereof from a plurality of locations. Confronting surfaces of the tab portions 122a, 122b which lie adjacent to each other in the circumferential direction and an axial side surface of the rim portion 121 which lies between the confronting surfaces cooperate with each other so as to form a pocket 123, so as to retain the ball 113 therein rotatably. The balls 113 are pushed into the pockets 123 which are provided at equal intervals in the circumferential direction from an opening side of the pair of tab portions 122a, 122b while elastically deforming the tab portions 122a, 122b and are eventually fitted in the pockets 123, respectively.

No specific limitation is imposed on a material for the crown cage 120, and for example, various types of synthetic resins can be used which include polyamide synthetic resins, thermoplastic synthetic resins and the like. In addition, reinforcement fibers such as glass fibers or carbon fibers may be added as required to the resins to increase the strength of the cage concerned, thereby deformation and damage thereto which would otherwise be caused at high temperatures and high speeds being prevented. Since the crown cage 120 has superior self-lubricating capability and low friction property, the crown cage 120 is effective in reducing friction torque loss.

The shield plate 114 is such as to be formed by forming, for example, a thin metallic plate into a substantially annular shape. an outer circumferential portion 114a of the shield plate 114 is press fitted in the groove 111b provided on the inner circumferential surface of the outer ring 111 in the axial end portion so as to be fixed in place in the groove. An inner circumferential portion 114b of the shield plate 114 is bent in the axial direction, so as to be disposed close to a groove 112b provided in an axial end portion on the outer circumferential surface of the inner ring 112 so as to form a labyrinth clearance C therebetween. Due to this structure, the inner circumferential portion 114b of the shield plate 114 is caused to be situated further radially inwards than a shoulder portion 12c of the inner ring 12. Note that the shield plate 114 may be formed into an annular shape as a whole by covering a metallic core with an elastic material such as rubber, synthetic resin and the like.

As shown in FIG. 5, the ball bearing 110 is built in so that the shield plate 114 and the rim portion 121 of the crown cage 120 lie opposite to each other with the balls 113 held therebetween. Namely, the outer ring 111 is fitted in a housing 101 and the inner ring 112 is fitted on a rotational shaft 102 so that the shield plate 114 is disposed on an upstream side relative to the balls 113 in a lubricating oil feeding direction (a direction indicated by an arrow A). The rim portion 121 of the crown cage 120 is disposed on a downstream side relative to the balls 113 in the lubricating oil feeding direction, whereby the ball bearing 110 is built into a device such as a transmission of a motor vehicle. As this occurs, a space defined between the housing 101 and the rotational shaft 102 functions as a feeding path 116 and a discharge path 117 for feeding and discharging lubricating oil into and from the bearing.

In addition, when lubricating oil is fed from a lubricating oil tank (not shown) from a side to the ball bearing 110 (a direction indicated by the arrow A) via the feeding path 116, the lubricating oil flows into an interior of the ball bearing 110 from the clearance C between the inner circumferential portion 114b of the shield plate 114 and the groove 112b. The lubricating oil so fed is then agitated by the tab portions 112a, 112b of the crown cage 120 and the balls 113 in association with the rotation of the ball bearing 110.

As this occurs, since the shield plate 114 prevents the flow of a large amount of lubricating oil which is more than required into the interior of the ball bearing 110, the amount of lubricating oil which is agitated by the tab portions 12a, 122b of the crown cage 120 and the balls is limited, and there is generated only a small drag torque in association with agitation of the lubricating oil.

After having lubricated the outer ring 111, the inner ring 112, the balls 113 and the sliding surface of the crown cage 120, the lubricating oil is discharged into the discharge path 117. However, there is caused almost no agitation action of the lubricating oil by the rim portion 121 of the crown cage 120 which is disposed on the downstream side of the bearing in the lubricating oil feeding direction, and a torque loss due to such an agitation action becomes small.

In addition, since the crown cage 120 made of synthetic resin has superior self-lubricating capability and low friction property, the friction resistance generated by the contact thereof with the balls 113 is small, and the friction torque loss becomes small.

As has been described heretofore, the drag torque generated in association with agitation of lubricating oil and frictional torque at the respective portions are made small so as to reduce the dynamic frictional torque of the ball bearing 110, thereby making it possible to increase the efficiency of a mechanical device such as a transmission of a motor vehicle into which the ball bearing 110 is built.

Furthermore, in the event that the feeding path 116 is also used as a feeding path to other peripheral parts (not shown) for feeding lubricating oil to those peripheral parts, since the feeding amount of lubricating oil which flows into the interior of the ball bearing 110 is restricted by the shield plate 114, a sufficient amount of lubricating oil can be fed to the peripheral parts, thereby making it possible to maintain a good lubricating performance.

Note that the invention is not limited to the embodiments that have been described heretofore but can be modified and improved variously as required.

While in the embodiments that have been described heretofore, the crown cage has been described as adopting the ball guide method, either an outer ring guide or an inner ring guide may be adopted. In addition, the shape and size of the shield plate may be designed as required according to the feeding amount of lubricating oil.

Next, a further embodiment of a ball bearing according to the invention will be described in detail based on the drawings.

Figure 7:
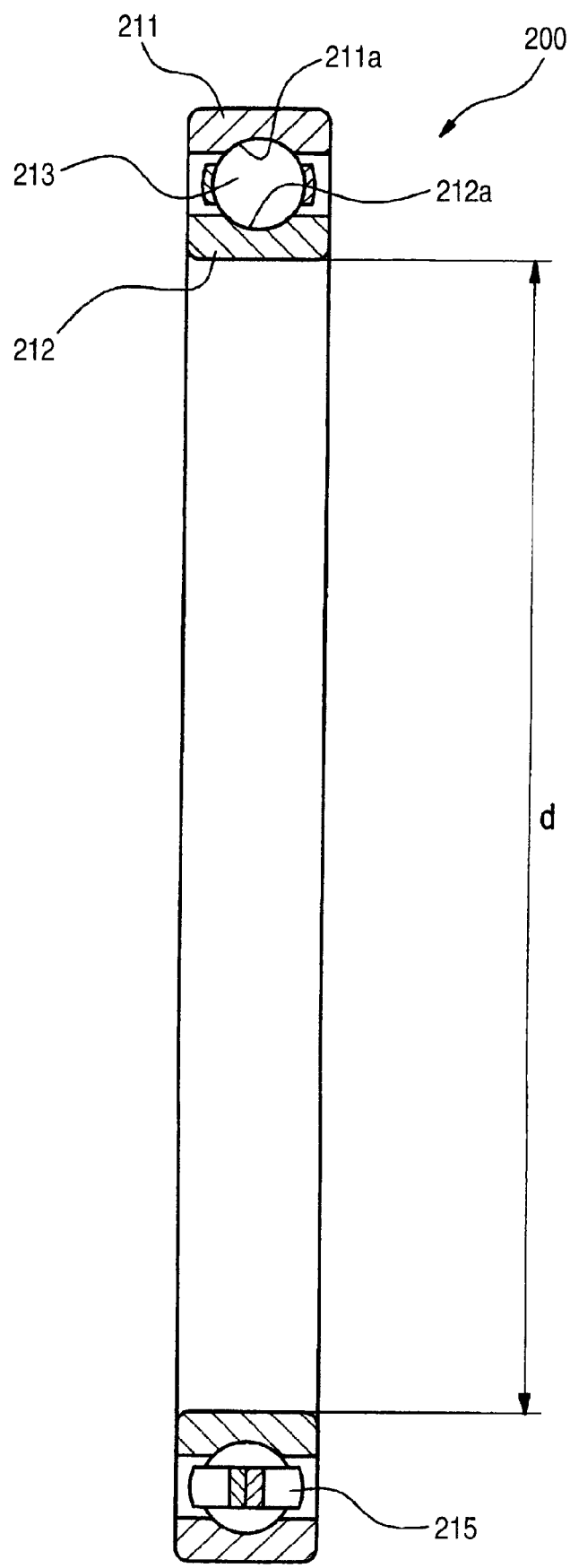
FIG. 7 is a vertical sectional view of a ball bearing according to a further embodiment of the invention.
Figure 8:
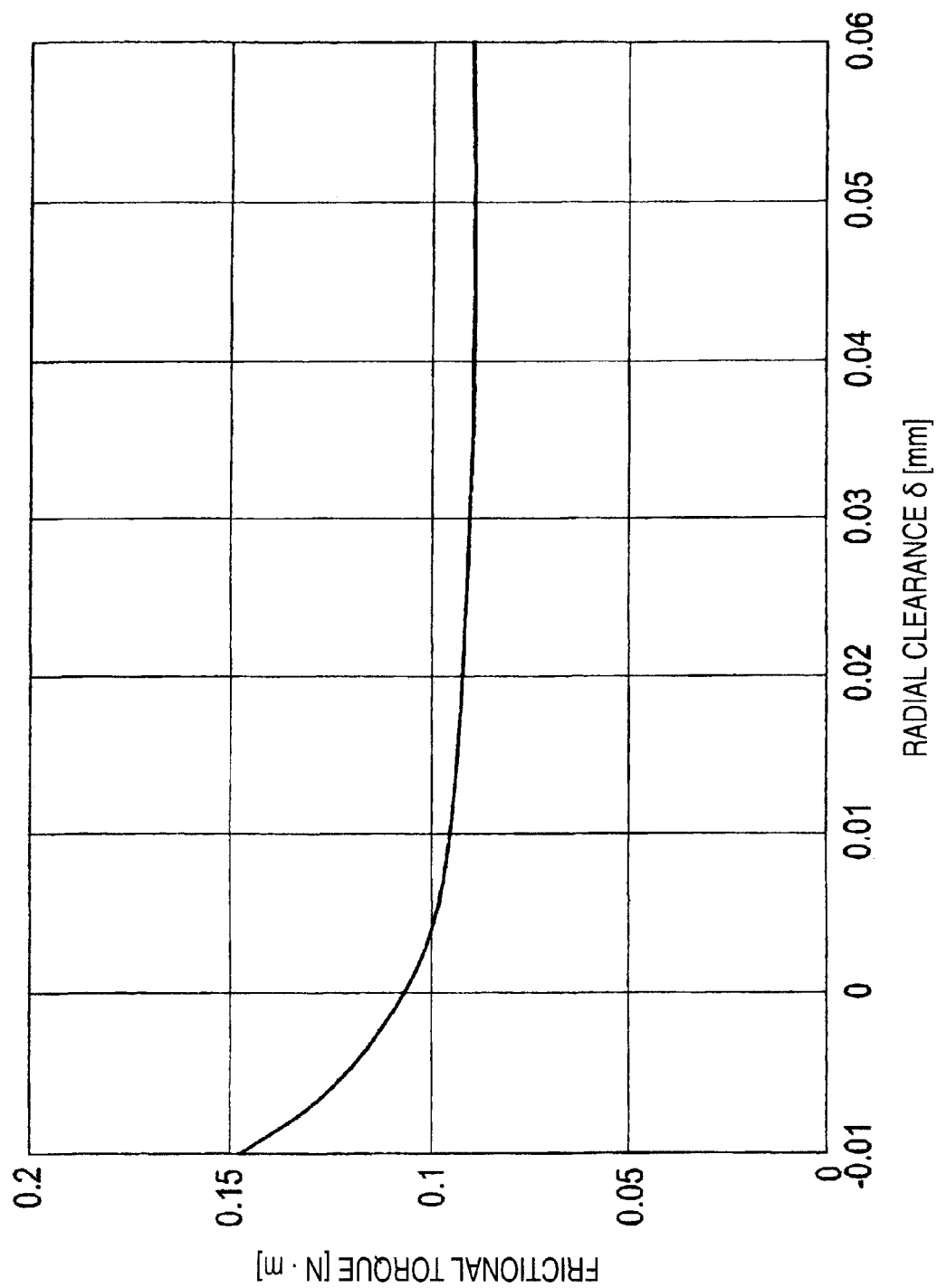
FIG. 8 is a graph showing a relationship between clearance and frictional torque of the ball bearing in a state that ball bearing is built in a device.

FIG. 7 is a vertical sectional view of a ball bearing according to a further embodiment of the invention, and FIG. 8 is a graph showing a relationship between a clearance of the ball bearing and frictional torque in a state that the ball bearing is built into a device.

As shown in FIG. 7, a ball bearing 200 is substantially made up of an outer ring 211 having an outer ring raceway 211a on an inner circumferential surface thereof, an inner ring 212 having an inner ring raceway 212a on an outer circumferential surface of thereof, a plurality of balls 213 which are rolling elements rotatably provided between the outer ring raceway 211a and the inner ring raceway 212a, and a cage 215 which is provided between the inner circumferential surface of the outer ring 211 and the outer circumferential surface of the inner ring 212 for retaining the plurality of balls 213 rotatably in pockets. In addition, in this embodiment, the cage 215 is made as a wave-shaped pressed-steel cage and having spherical pockets which resemble the balls in shape.

This ball bearing 200 has a bore diameter d of 100 mm or more, the ball bearing 200 supports, for example, a power transmission gearwheel shaft or a motor shaft (both not shown), and these shafts are fittingly passed through the inner ring 212, the inner ring 212 functioning as a rotating ring.

In addition, the ball bearing 200 is set such that a radial clearance becomes 20 µm or more in a state that the ball bearing is built into a device such as a transmission. The torque of the ball bearing 200 can be reduced largely by setting the radial clearance to 20 µm or more in a state that the ball bearing is built into the device. Note that in the event that the radial clearance resulting in a state that the ball bearing is built into the device is excessively large, the durability of the ball bearing 200 is reduced or the runout of the shaft while rotating is increased, whereby abnormal noise or abnormal vibration is generated, and therefore, it is preferable to set the radial clearance resulting in a state that the ball bearing is built into the device to on the order of 60 µm or less.

FIG. 8 shows a relationship between a radial clearance δ and frictional torque T when using as an example a deep groove ball bearing of JIS bearing number 6826 (whose bore, outside diameter and width are φ130 mm, φ165 mm, and 18 mm, respectively) which is specified under JIS B 1513. The measuring conditions of frictional torque T was as follows.
[Rotation speed]: 3000 rpm
[Load]: radial load 300 N, axial load 300 N
[Lubrication Method]: oil bath lubrication
[Temperature]:50° C.

As shown in FIG. 8, the frictional torque T of the ball bearing gradually decreases as the radial clearance δ increases, and the value of the radial clearance δ becomes substantially constant when it reaches or exceeds 20 μm. In addition, the value (substantially 0.09 Nm) of frictional torque T when the radial clearance δ is 20 μm becomes substantially 60% of the value (substantially 0.15 Nm) of frictional torque T when the radial clearance δ is −10 μm. Thus, by setting the radial clearance δ to the optimum value, the frictional torque T can be reduced largely.

As has been described heretofore, the torque of the bearing can be reduced largely by making the radial clearance of the ball bearing of which the bore diameter of the inner ring is 100 mm or more be 20 μm or less in a state that the ball bearing is built in the device.

Next, an embodiment of a ball bearing according to the invention will be described.

Figure 9:
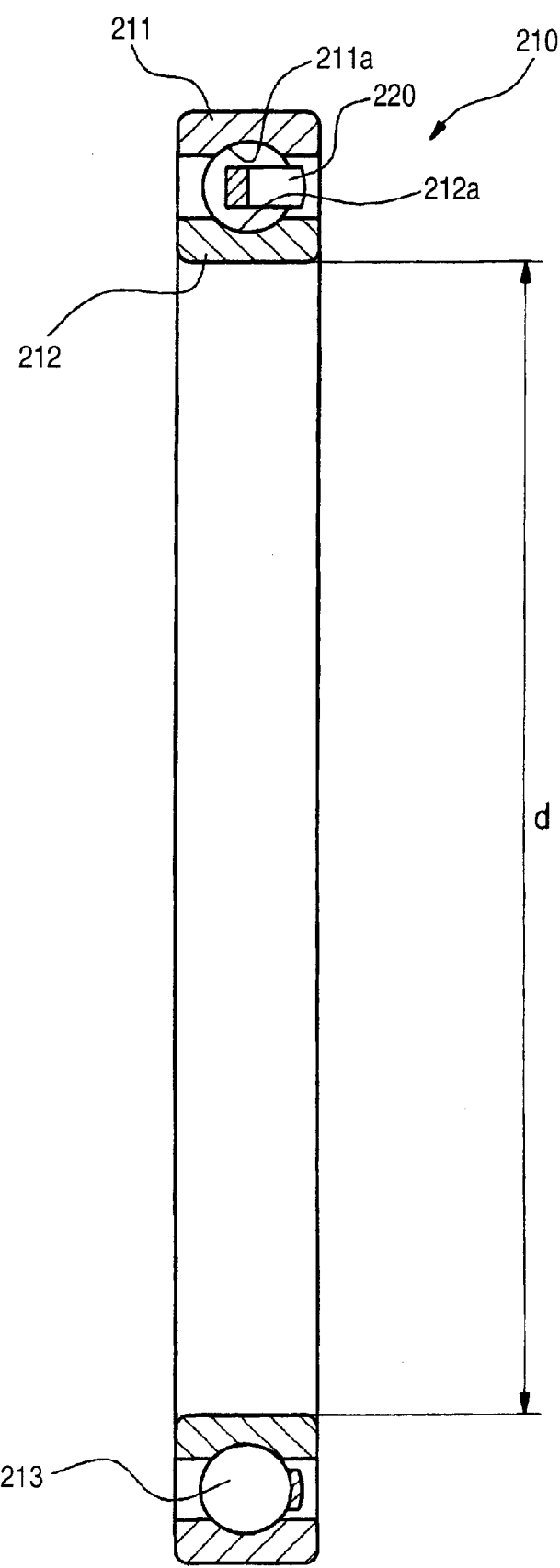
FIG. 9 is a vertical sectional view of a ball bearing according to an embodiment of the invention.
Figure 10:
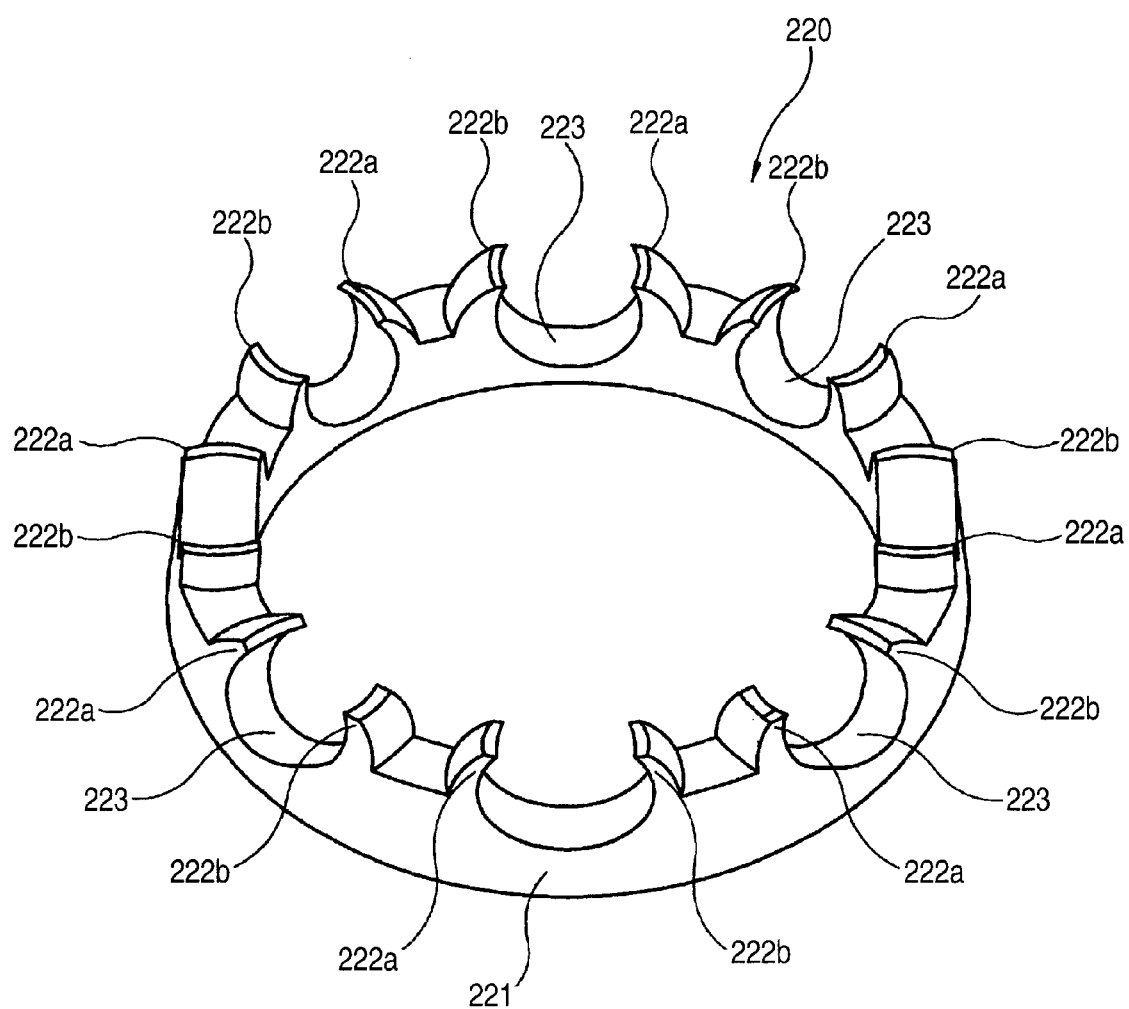
FIG. 10 is a perspective view of a crown cage shown in FIG. 9.

FIG. 9 is a vertical sectional view of a ball bearing according to an embodiment of the invention which includes a crown cage made of synthetic resin, and FIG. 10 is a perspective view of the crown cage shown in FIG. 9. Since a ball bearing 210 of this embodiment is similar to the ball bearing 200 that has already been described in FIGS. 7 and 8 except that a cage thereof is a crown cage made of synthetic resin, like reference numerals will be imparted to like portions to those of the ball bearing 200, and the description thereof will be omitted.

As shown in FIG. 10, a crown cage 220 made of synthetic resin includes an annular main portion 221, tab portions 222*a*, 222*b* which are provided in a plurality of locations on the main portion 221 at intervals in a circumferential direction thereof so as to project therefrom towards an axial side and ball accommodating pockets 223 which are provided between the tab portions 222*a*, 222*b* which lie adjacent to each other in the circumferential direction, respectively. Side surfaces of the tab portions 222*a*, 222*b* which confront each other are formed into curved surfaces having substantially the same radius of curvature as the radius of curvature of the ball 213 so as to rolling retain the balls 213.

The balls 213 are pushed respectively into the pockets 223 provided at equal intervals on the main portion 221 from an opening side (an upper side as viewed in FIG. 10) of the tab portions 222*a*, 222*b*, whereby the balls 213 come to be rotatably accommodated in the pockets 223 while elastically deforming the pairs of guide portions 222*a*, 222*b*.

Although no specific limitation is imposed on materials for the crown cage 220 made of synthetic resin, for example, a material in which 25 to 30 wt % of glass fiber is contained in a polyamide resin such as nylon 46 is effective in preventing deformation and damage at high temperatures and high speeds. In addition, depending upon rotating conditions, a polyamide resin such as nylon 46 which contains 10 to 25 wt % of glass fiber may be used, or a polyamide resin such as nylon 66 may be used as a main material. In addition, it may be possible to use, as a thermoplastic resin, polyether ether ketone (PEEK), polyether ketone (PEK), polyether sulfone (PES), polyether imide (PEI), polyamide imide (PAI), polyphenylene sulfide (PPS), polyallylether nitrile (PEN) and thermoplastic polyimide resin (TPI), and it may be possible to use, as a heat-resistant resin, polybenzimidasole (PBI). In addition, it may raise, as reinforcement fiber, carbon fiber, glass fiber, boron fiber, aramid fiber, whisker, and what is formed into fiber from an inorganic material (silicone oxide, silicon carbide, silicon nitride, alumina and the like) or an organic material (polyethylene, polyarylate and the like).

Since the synthetic resin crown cage 220 has superior self-lubrication capability and low friction resistance with the balls 213, the crown cage 220 is effective in reducing the torque of the ball bearing 210. In addition, little dust is generated which would otherwise be generated through sliding contact between the cage and the balls which would occur with an wave-shape pressed-steel cage, and the rotating performance at high speeds is secured, a problem of roughening or skidding being made difficult to be generated. Since the other functions and advantages of this embodiment are similar to those of the ball bearing 200 illustrated in FIGS. 7 and 8, the description thereof will be omitted here.

Figure 11:
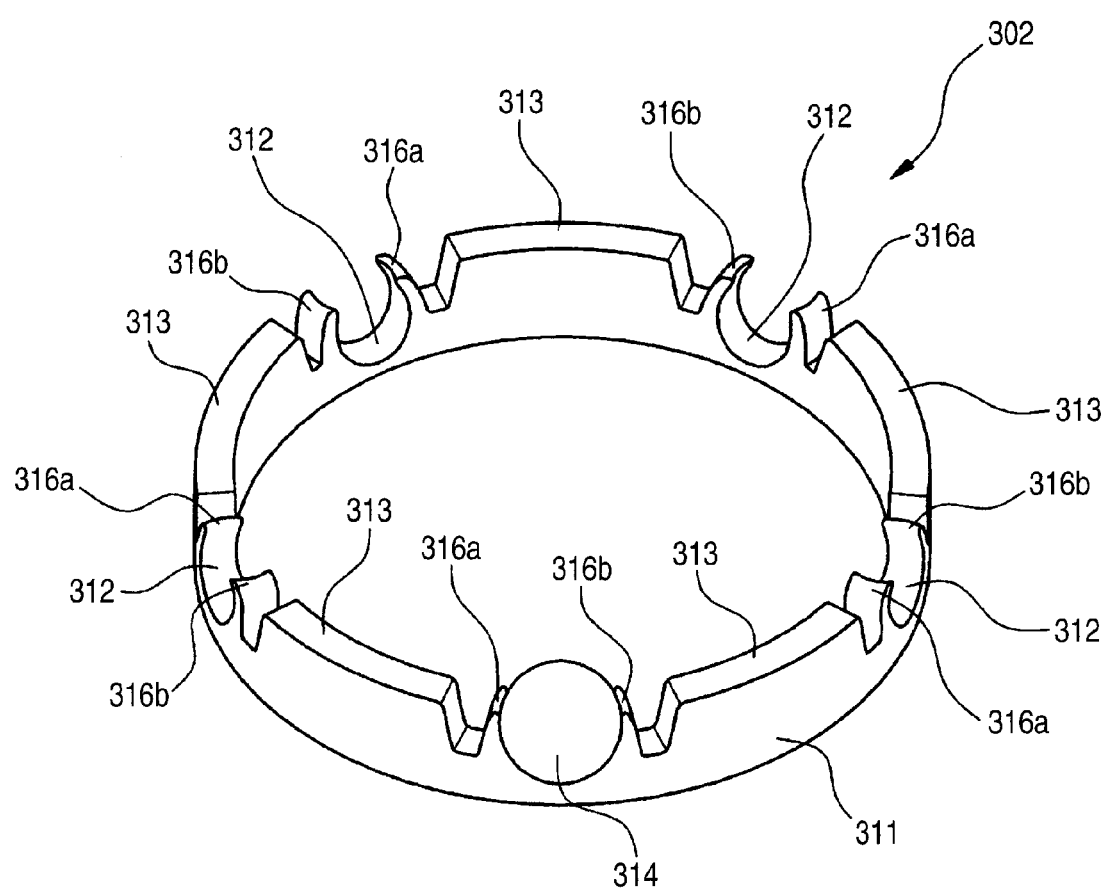
FIG. 11 is a perspective view of a cage according to another embodiment of the invention.
Figure 12:
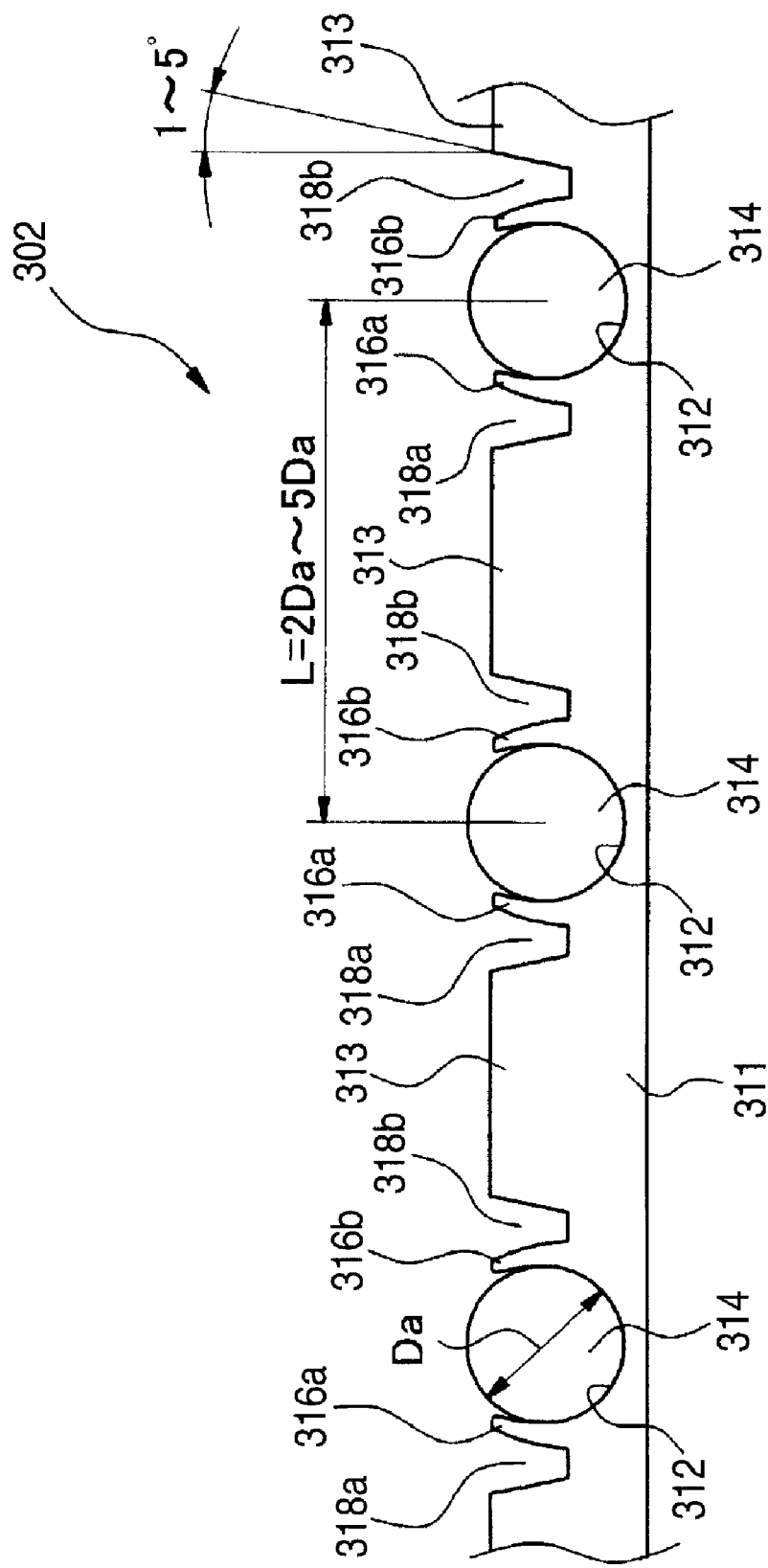
FIG. 12 is a partial deployment of the cage according to the embodiment.
Figure 13:
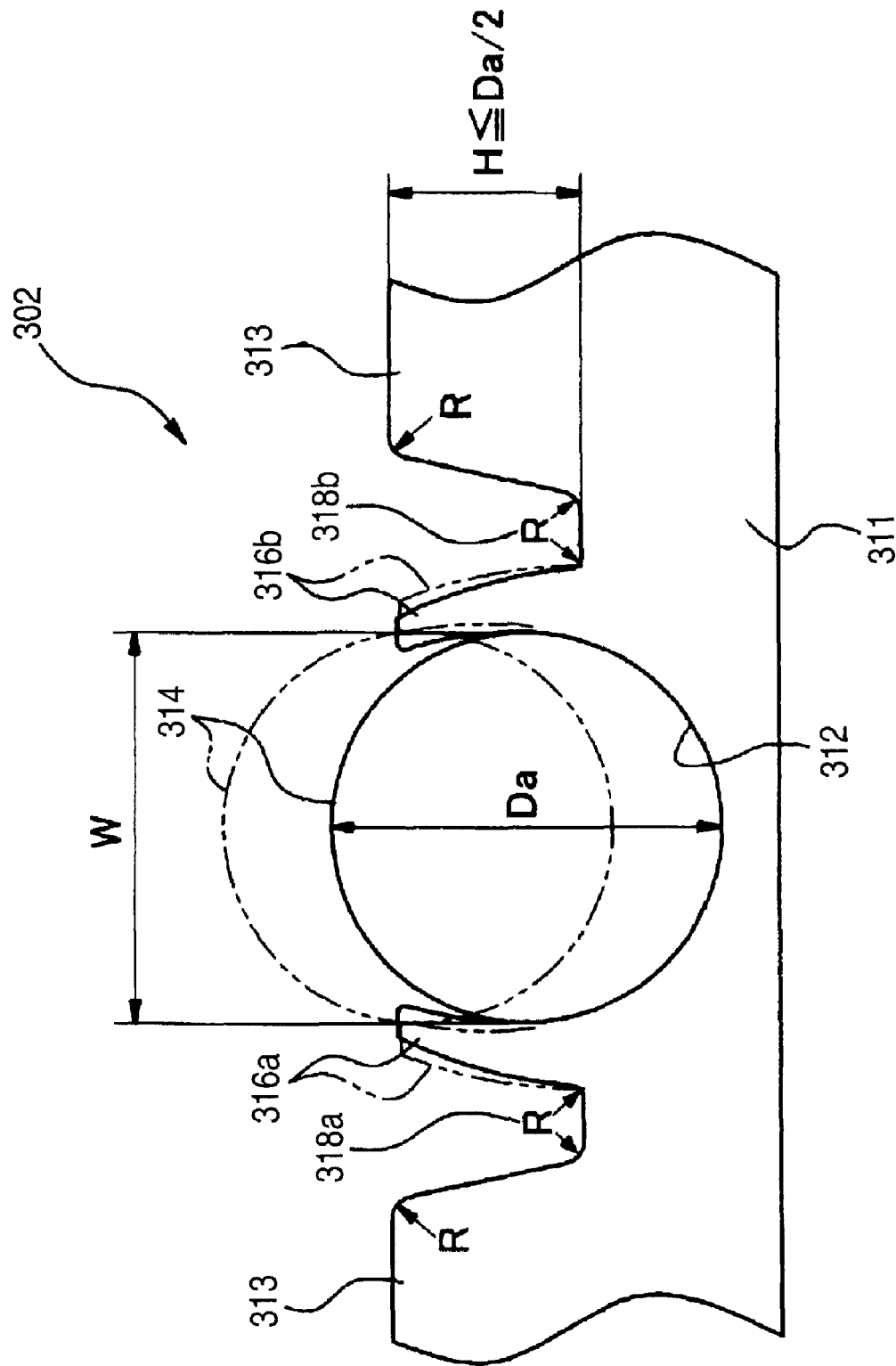
FIG. 13 is an enlarged view of a main part of the cage in FIG. 12.

FIG. 11 is a perspective view of a ball bearing crown cage according to another embodiment of the invention, FIG. 12 is a partial deployment of the cage of the invention, and FIG. 13 is an enlarged view of a main part of FIG. 12.

A cage 302 has a configuration in which pockets 312 and raised portions 313 are formed integrally on an annular cage main body 311 shown in FIG. 11 at predetermined intervals and balls 314 are fitted in the pockets 312, respectively, through a snap-in method. The pockets 312 are provided on the cage main body 311 at predetermined equal intervals. In addition, the number of pockets 312 can freely be modified as required.

In this embodiment, although in total, five pockets 312 are shown in the figure, since configurations of the respective pockets 312 are the same, common reference numerals will be used in the pockets for illustration. An opening end of the pocket 312 is defined by a pair of tab pieces 316*a*, 316*b*, and confronting side surfaces of the tab pieces 316*a*, 316*b* are formed into curved surfaces so as to rotatably retain the balls 314.

As shown in FIG. 13 in an enlarged fashion, upper end portions of the pair of tab pieces 316*a*, 316*b* are set to define therebetween a narrower width W than a diameter Da of the ball. Consequently, as is indicated by an imaginary line in FIG. 13, when the ball 314 is pushed from an opening of the pocket 312, the pair of tab pieces 316*a*, 316*b* are slightly opened as indicated by an imaginary line. Then, by pushing the ball 314 further, the ball 314 enters the pocket 312 against the elastic force applied by the pair of tab pieces 316*a*, 316*b* so as to be accommodated therein rotatably.

Namely, although the ball 314 is accommodated in the interior of the pocket 312 through the snap-in method for rolling retention therein, as is indicated by a solid line in FIG. 13, the pair of tab pieces 316*a*, 316*b* restore their original shapes so as to retain the ball 314 in a state that the ball 314 is accommodated in the pocket 312. Consequently, the dislocation of the ball 314 from the pocket never happens, whereby the ball is allowed to roll in the pocket 312 in a stable fashion.

Raised portions 313 are formed outwards of the pair of tab pieces 316*a*, 316*b* along a circumferential direction of the crown cage 311 via spaced portions 318*a*, 318*b*, respectively. In addition, circumferential end faces of the raised portion 313 are inclined on the order of 1° to 5° so as to taper the raised portion 313, and a top portion of the raised portion 313 is formed flat.

The height H of the raised portion 313 from a bottom of the spaced portion 318*a*, 318*b* is the same as the height of the tab piece 316*a*, 316*b*, and the height H is set to a radius (Da/2) of the ball or less. Namely, assuming that the diameter of the ball is Da, the height H is set to a relationship with the diameter expressed as H≦Da/2. This height H is set as desired by changing the depth of the spaced portions 318a, 318b. In addition, internal corner portions at the bottoms of the spaced portions 318a, 318b and external corner portions of the raised portions 313 are individually radiused to on the order of 0.2 R.

The raised portions 313 are provided respectively between the pockets and are each formed into an arc shape as viewed from the axial direction. Letting a distance between centers of the pockets 313 be L and the diameter of the ball 314 be Da, as shown in FIG. 12, the distance L is set to be of the order of 2 Da to 5 Da. In addition, the raised portion 313 rises from each pocket 312 in a tapered fashion via the spaced portion 318a, 318b, and the axial end portion thereof is formed flat.

In addition, the height H of the raised portions 313 are the same as the height of the tab pieces 316a, 316b, and the radial width thereof is also made to be the same as the radial width of the tab pieces 316a, 316b.

Consequently, when the cage 302 is built in the bearing and is rotated at high speeds, the flat surfaces of the raised portions 313 continue in the circumferential direction at the same height as the tab pieces 316a, 316b, whereby no specific oil agitation loss is generated only in the tab pieces 316a, 316b, and hence, the flow of lubricating oil can be straightened, thereby making it possible to largely reduce the torque loss.

Furthermore, in the event that the numbers of balls and pockets are reduced so as to attain a torque reduction, although the intervals at which the pockets 312 are provided are extended, since no recessed portion continues between the pockets 312 has occurred conventionally but the raised portion 313 continues between the pockets 312, no agitation of lubricating oil happens in the vicinity of the tab pieces 316a, 316b, thereby making it possible to reduce largely the torque loss.

The pair of tab pieces 316a, 316b have to be opened elastically in order for the ball 314 to be accommodated in the pocket 312 through the snap-in method. On the other hand, the cage 311 is made of plastic, and not only the tab pieces 316a, 316b but also the spaced portions 318a, 318b and the raised portions 313 are molded integrally. Consequently, the tab pieces 316a, 316b need to be prevented from collapsing inwards in the radial direction due to shrinkage that occurs in a cooling step which follows a molding step.

If the tab pieces 316a, 316b tilt radially inwards of the cage 302, the dimension accuracy can no more be obtained, whereby not only the ball 314 cannot be pushed into the pocket 312 through the snap-in method but also there is caused a fear that the rigidity of the cage 302 becomes insufficient when the bearing is rotated at high speeds and the cage 302 is subjected to such deformation that the cage 302 is opened outwards, where the cage 302 comes to fail.

Then, in this embodiment, in order to prevent the occurrence of such a problem and disturbance to the elastic deformation of the tab pieces 316a, 316b at the time of assembling, a minimum width in the bottom portion of the spaced portions 318a, 318b is set to be equal to or more than an elastic deformation amount ((Da−W)/2) of the tab pieces 316a, 316b. According to this configuration, the occurrence of the problem at the time of assemblage can be prevented.

Figure 14:
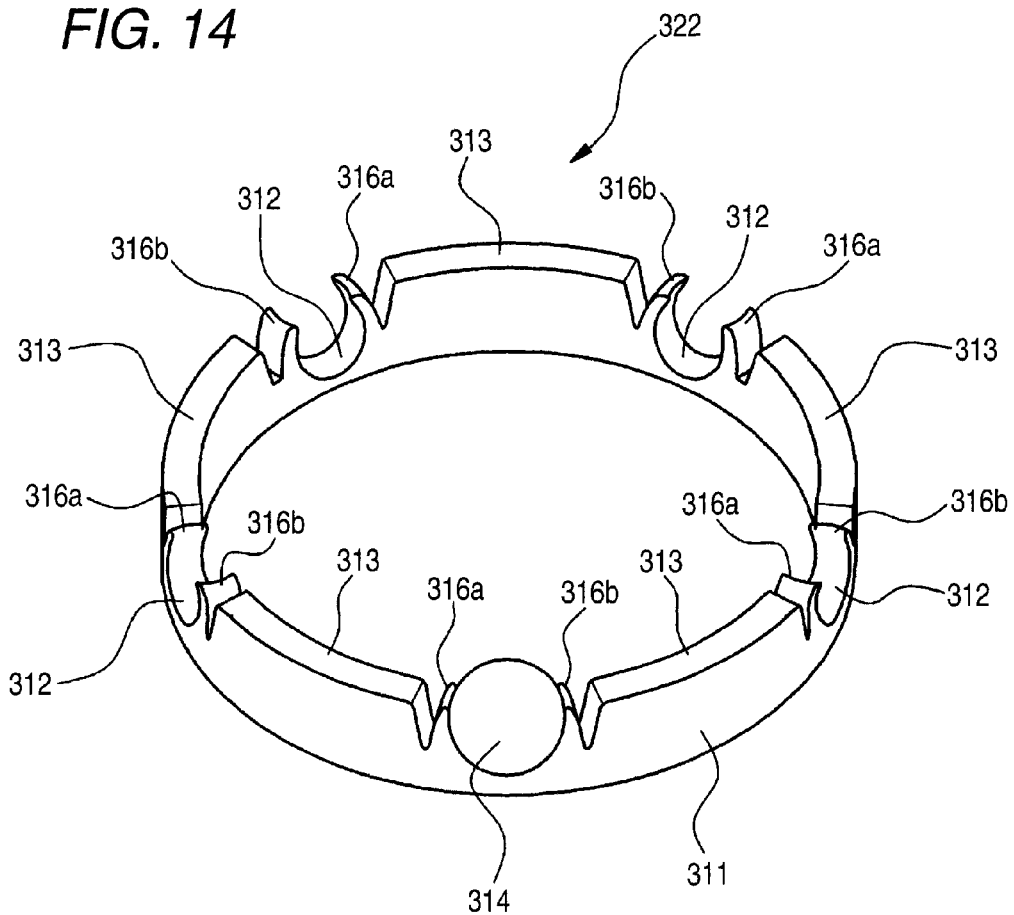
FIG. 14 is a perspective view of a cage according to a further embodiment of the invention.
Figure 15:
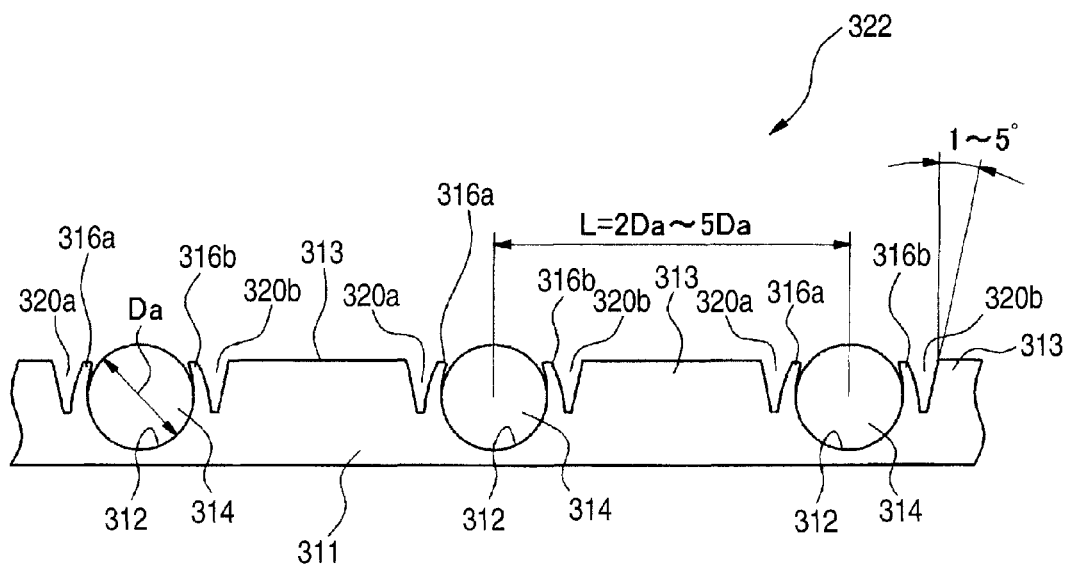
FIG. 15 is a partial deployment of the cage according to the embodiment.
Figure 16:
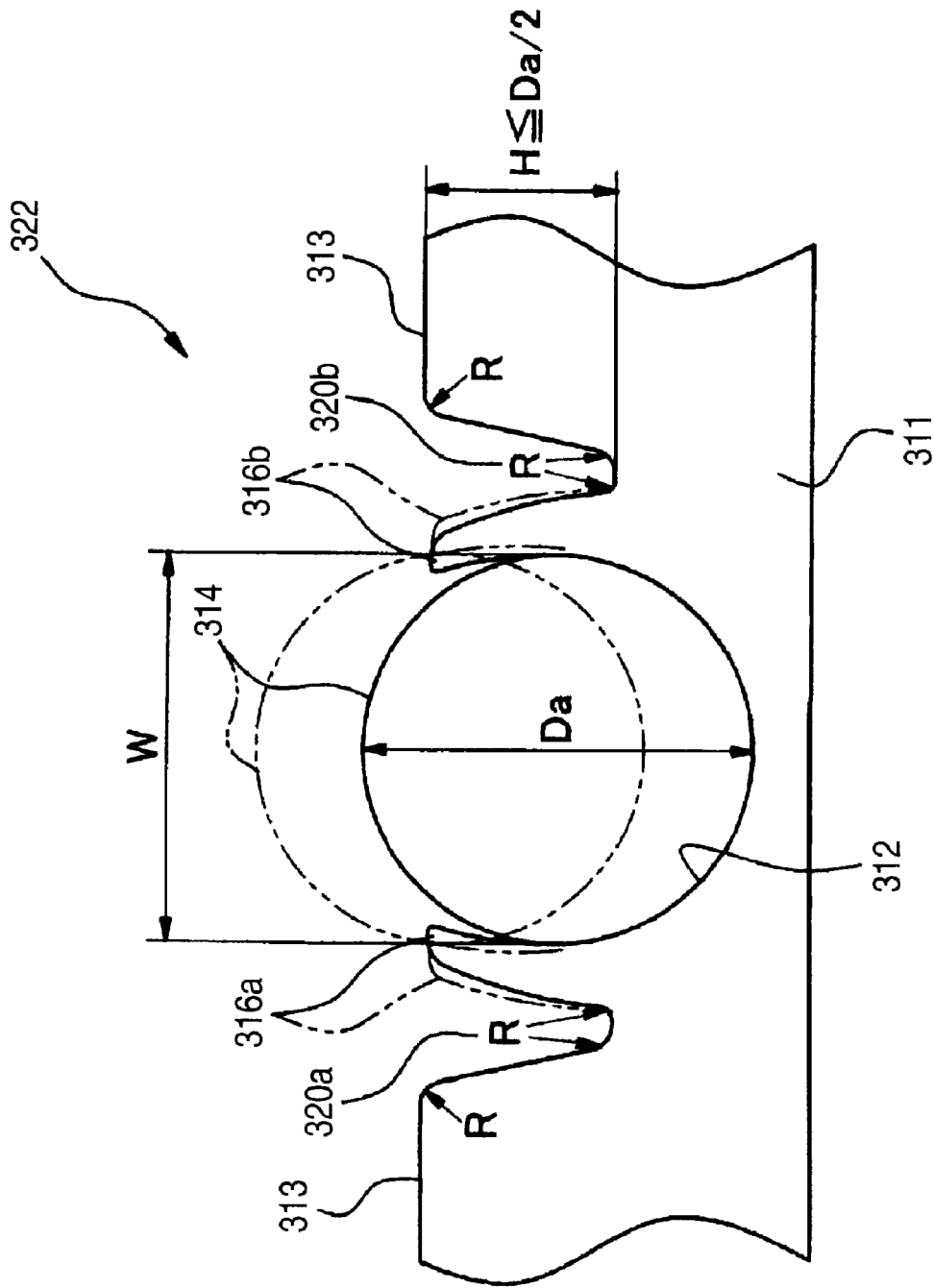
FIG. 16 is an enlarged view of a main part of the cage in FIG. 15.

Next, a further embodiment of the invention will be described. FIG. 14 is a perspective view of a cage of the further embodiment, FIG. 15 is a partial deployment of the cage of the embodiment, and FIG. 16 is an enlarged view of a main part of the cage shown in FIG. 15.

This embodiment differs from the embodiment that has been described above in the configuration of spaced portions 320a, 320b. As has been described above, while the minimum width in the bottom portion of the spaced portions 318a, 318b is set to be equal to or more than the elastic deformation amount of the tab pieces 316a, 316b. In this embodiment, the width of the spaced portions 320a, 320b is made narrower than the width described in the previous embodiment. Since the other configurations of this embodiment are similar to those of the previous embodiment, like reference numerals will be imparted to like portions to those of the previous embodiment in FIGS. 14 to 16, and the description thereof will be omitted. However, functions and advantages provided by the similar configurations will be similar to those of the previous embodiment.

In this way, because the width between the spaced portions 320a, 320b is narrow and the tab pieces 316a, 316b is close to the raised portions 313, the tab pieces 316a, 316b cooperates with the raised portion 313 to straighten the flow of lubricating oil, and no agitating action of lubricating oil by the tab pieces 316a, 316b is generated.

Note that the width of the spaced portions 320a, 320b is preferably made as narrow as possible without interrupting the elastic deformation of the tab pieces 316a, 316b, and the straightening action of lubricating oil by the raised portions 313 of this embodiment is superior to that of the previous embodiment.

Hereinafter, an embodiment of a resin cage according to the invention will be described in detail by reference to the drawings.

Figure 17:
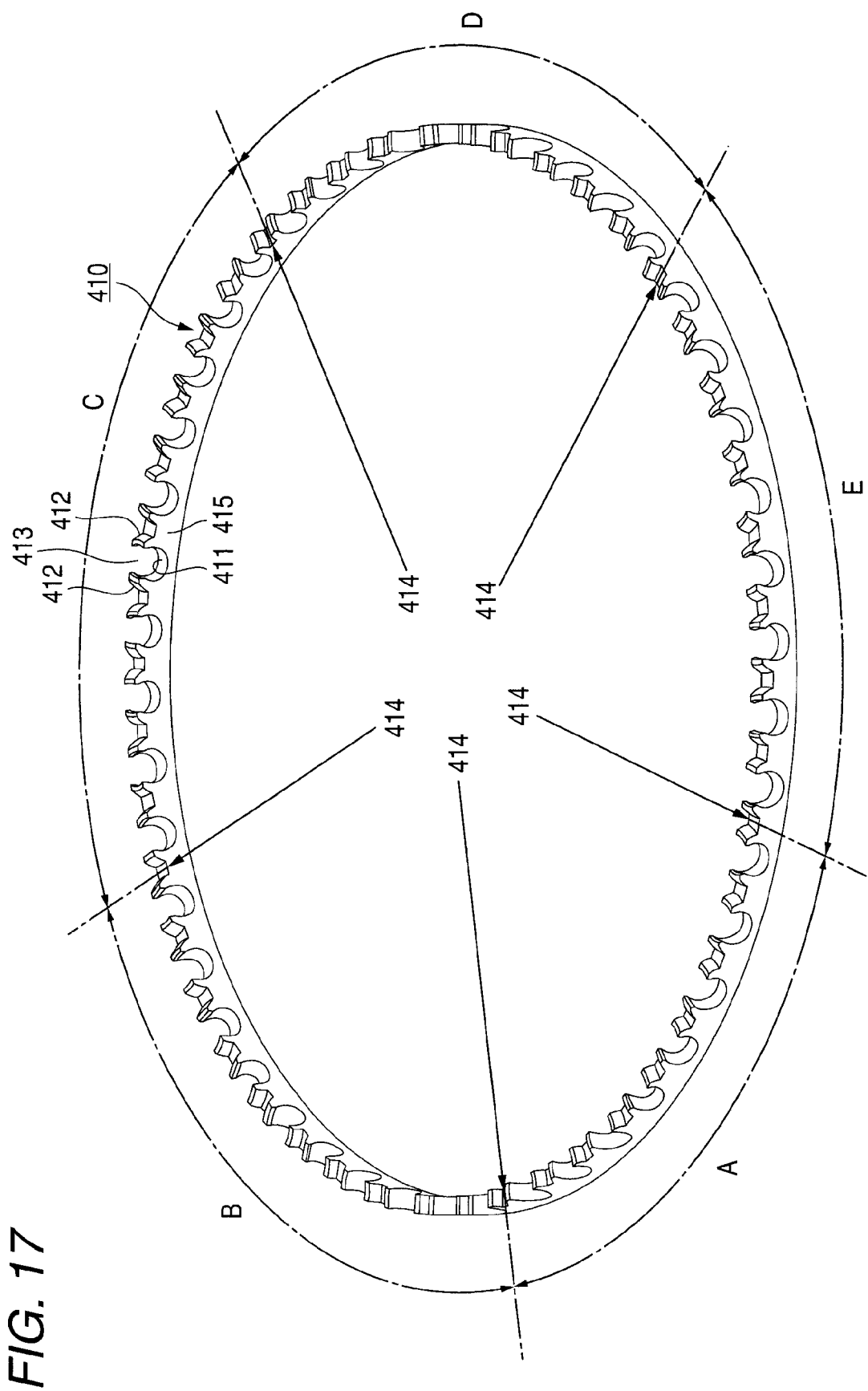
FIG. 17 is a perspective view illustrating an embodiment of a resin cage according to the invention.
Figure 18:
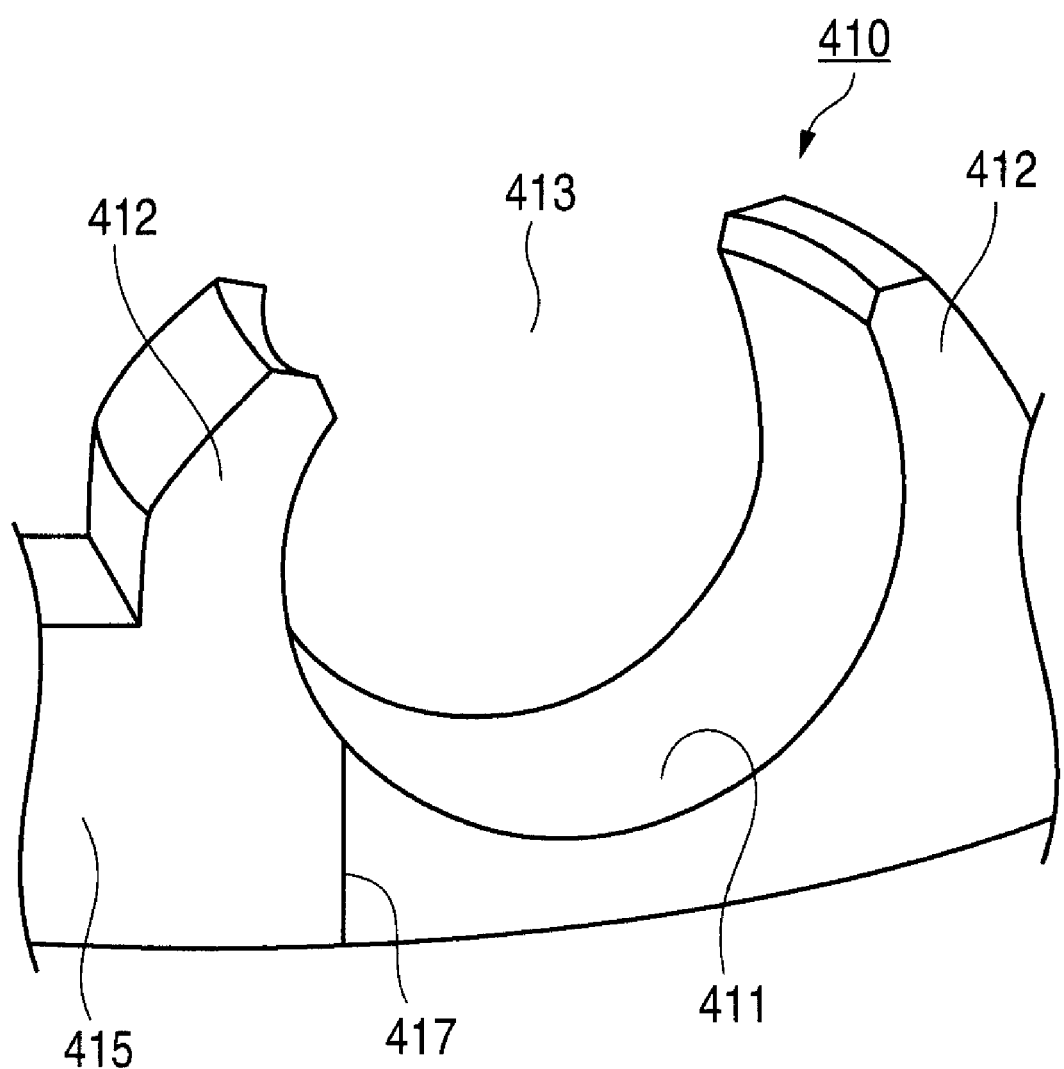
FIG. 18 is an enlarged perspective view illustrating weld lines formed in areas defined between gates.

FIG. 17 is a perspective view which illustrates a resin cage according to an embodiment of the invention, and FIG. 18 is an enlarged perspective view which illustrates a weld line that is formed in an area between gates.

As shown in FIG. 17, a resin cage 410 of this embodiment has pocket portions 411 for retaining rotatably a plurality of balls (not shown), which are rolling elements, at substantially equal intervals in a circumferential direction thereof, and a pair of tab portions 412 are formed at circumferential end portions of an inner circumferential surface of each of the pocket portions 411 so as to project in an axial direction thereof. In addition, an opening portion 413 is formed between distal ends of the pair of tab portions 412, and by pushing the ball into the pocket portion 411 from this opening portion 413 while forcing the pair of tab portions 412 to open, the ball is retained rotatably within the pocket portion 411 via a minute clearance.

In addition, the resin cage 410 is such as to be injection molded by a mold which includes a plurality of gates 414 (which are provided in five locations as shown in FIG. 17), and as resin material for the cage, nylon 46, PPS and PEEK are preferably used which contain 20 to 40 wt % of carbon fiber or glass fiber. In addition, specifically, the resin cage 410 is formed such that the PCD becomes ϕ120 mm or more and ϕ200 nm or less.

In addition, in this embodiment, the resin cage 410 is divided into areas A, B, C, D, E by the gates 414 provided in the five locations, and the numbers of pocket portions 411 which are provided respectively in the areas A to E are made to be numbers which are even numbers and which become even or closest to being even (numbers which vary as little as possible). Furthermore, circumferential lengths of the respective areas A to E are set to 60 mm or more and 120 mm or less.

Specifically, with five gates 414 and forty-six pocket portions 411 in total, the numbers of pocket portions 411 provided respectively in the areas A, B, C, D, E are set to even numbers, and the numbers of pocket portions 411 in the areas A, B, C are each set to "ten" and the numbers of pocket portions 411 provided in the areas D, E are each set to "eight".

In the resin cage 410 configured as has been described above, since the numbers of pocket portions 411 which are disposed respectively in the areas A to E are made to be numbers which are even numbers and which become even or closest to being even, as shown in FIG. 18, weld lines 417 formed respectively in the areas A to E are formed in positions which are offset circumferentially from bottoms of the pocket portions 411.

As has been described heretofore, according to the resin cage 410 of the embodiment, since the numbers of pocket portions 411 which are disposed respectively in the areas A to E defined between the gates 414 are made to be numbers which are even numbers and which become even or closest to being even, even with a cage of a large diameter, the weld lines 417 formed respectively in the areas A to E are formed in the positions which are offset circumferentially from the bottoms of the pocket portions 411. Therefore, the rigidity of the cage 410 can be increased, thereby making it possible to increase the strength of the cage 410. In addition, since the areas A to E defined between the gates 414 can be balanced substantially evenly, the molding accuracy of the cage 410 can be increased.

In addition, according to the resin cage 410 of the embodiment, since the circumferential lengths of the respective areas A to E are set to 60 mm or more and 120 mm or less, a failure due to short molding during injection molding can be avoided.

Note that the invention is not limited to the embodiment that has been described heretofore but can be modified or improved as required.

For example, while in the embodiment above, the resin cage is described as being molded by the mold having five gates and as having forty-six pocket portions in total, the numbers of gates and pocket portions are not limited thereto, and hence, for example, a resin cage may be adopted which is made to be molded by a mold having three gates and to have twelve pocket portions. As this occurs, the numbers of pocket portions provided in areas defined respectively between the three gates are each set to an even number, that is, "four."

Hereinafter, another embodiment of a resin cage according to the invention will be described in detail by reference to the drawings.

Figure 19:
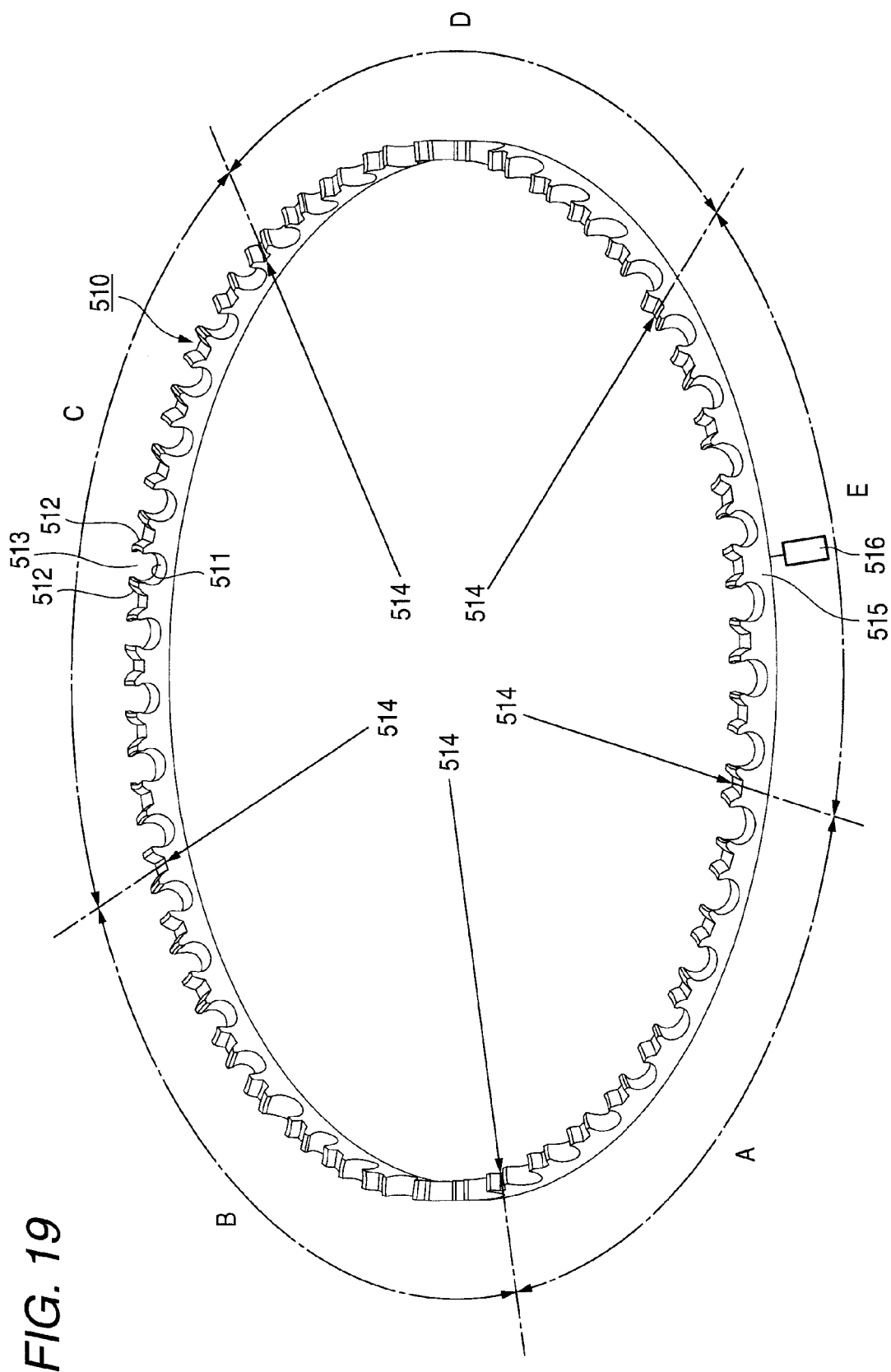
FIG. 19 is a perspective view illustrating another embodiment of a resin cage according to the invention.
Figure 20:
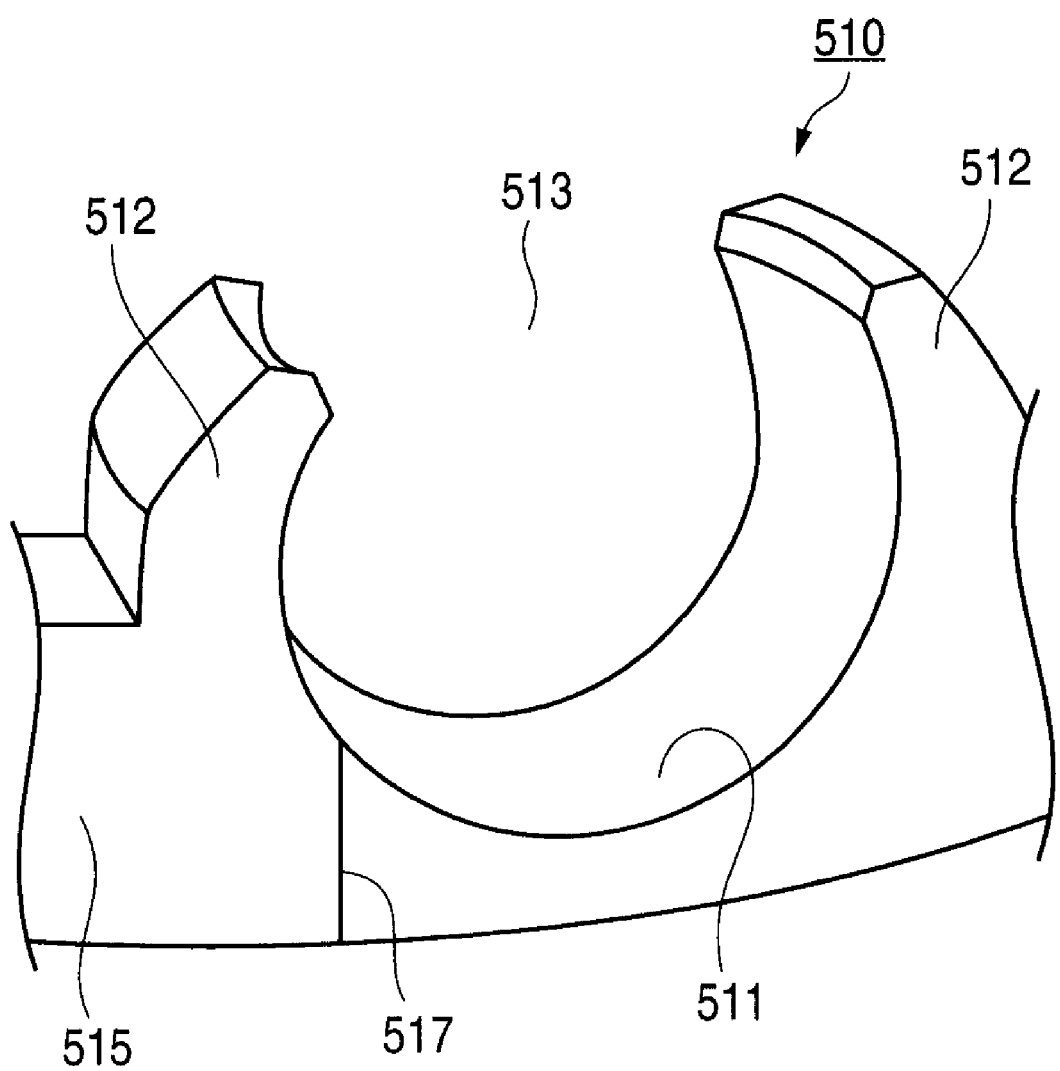
FIG. 20 is an enlarged perspective view illustrating a pocket portion which is situated in a circumferential center between the gates which are provided between an odd number of pocket portions.

FIG. 19 is a perspective view which illustrates a resin cage according to another embodiment of the invention, and FIG. 20 is an enlarged perspective view which illustrates a pocket portion which is situated in a circumferential center of an odd number of pocket portions which are provided in an area defined between gates.

As shown in FIG. 19, a resin cage 510 of this embodiment has pocket portions 511 for retaining rotatably a plurality of balls (not shown), which are rolling elements, at substantially equal intervals in a circumferential direction thereof, and a pair of tab portions 512 are formed at circumferential end portions of an inner circumferential surface of each of the pocket portions 511 so as to protect in an axial direction thereof. In addition, an opening 513 is formed between distal ends of the pair of tab portions 512, and by pushing the ball into the pocket portion 511 from this opening 513 while forcing the pair of tab portions 512 to open, the ball is retained rotatably within the pocket portion 511 via a minute clearance.

In addition, the resin cage 510 is injection molded by a mold which includes a plurality of gates 414 (which are provided in five locations as shown in FIG. 19) and a single basin 516. As resin material for the cage, nylon 46, PPS and PEEK are preferably used which contain 20 to 40 wt % of carbon fiber or glass fiber. In addition, specifically, the resin cage 410 is formed such that the PCD becomes φ120 mm or more and φ200 mm or less.

In addition, in this embodiment, the resin cage 510 is made to have an odd number of pocket portions 511 in total. In addition, the resin cage 510 is divided into areas A, B, C, D and E by the gates 514 provided in the five locations. The numbers of pocket portions 511 which are provided respectively in the areas A to E are set numbers which become closest to be even (numbers which vary as little as possible). In addition, the number of pocket portions in the area E is set to be smaller than the numbers of pocket portions 511 in the areas A to D. Furthermore, circumferential lengths of the respective areas A to E are set to 60 mm or more and 120 mm or less.

Specifically, with five gates 514 and forty-five pocket portions 511 in total, the numbers of pocket portions 511 provided respectively in the areas A, B, C, D are set to even numbers, and the numbers of pocket portions 511 in the areas A, B, C are each set to "10," the number of pocket portions 511 provided in the area D is set to "8" The number of pocket portions 511 in the remaining area is set to "7" which is odd number and also is smaller than the numbers of pocket portions 511 in the areas A, B, C and D.

In addition, pillar portions 515 are formed at both end portions of each of the pocket portions 511 of the resin cage 510. The basin 516 is positioned in either of the pillar portions 515 of the pocket portion 511 which is situated in a circumferential center of the area E. Thus, as shown in FIG. 20, a weld line 517 formed in the area E is positioned between a bottom of the pocket portion 511 which is situated in the circumferential center of the area E and the basin 516 and is positioned in a location where a radial sectional area of the weld line 517 becomes twice a radial sectional area of the bottom of the pocket portion 511.

As has been described above, according to the resin cage 510 of the embodiment, the total number of pocket portions 511 is made to be the odd number; the numbers of pocket portions, which are disposed in the areas A to E defined respectively between the gates 514, are made to be the numbers closest to be even; and the basin 516 is positioned in either of the pillar portions 515 formed at the end portions of the pocket portion 511 which is positioned in the circumferential center of the area E defined between the gates between which the odd number of pocket portions are disposed. Therefore, although a cage of which total number of pocket portions 511 is the odd number and which has a large diameter, since the weld line 517 formed in the area E of the cage 510 is formed in the position which is offset from the bottom of the pocket portion 511 in the circumferential direction, the rigidity of the cage 510 can be increased, thereby making it possible to increase the strength of the cage 510. In addition, since the areas A to E defined between the gates 514 can be balanced substantially evenly, the molding accuracy of the cage 510 can be increased.

In addition, according to the resin cage 510 of the embodiment, since the weld line 517 formed in the area E is positioned between the bottom of the pocket portion 511 which is situated in the circumferential center of the area E and the basin 516 and is positioned in the location where the sectional area of the weld line 517 becomes twice the sectional area of the bottom of the pocket portion 511, the rigidity of the cage 510 can be increased further, thereby making it possible to increase further the strength of the cage 510.

Additionally, according to the resin cage 510 of the embodiment, since the circumferential lengths of the respective areas A to E are set to 60 mm or more and 120 mm or less, a failure due to short molding during injection molding can be avoided.

Note that the invention is not limited to the embodiment that has been described heretofore but can be modified or improved as required.

For example, while in the embodiment above, the resin cage is described as being molded by the mold having five gates and as having forty-five pocket portions in total, the numbers of gates and pocket portions are not limited thereto. For example, a resin cage may be adopted which is made to be molded by a mold having three gates and to have seventeen pocket portions. As this occurs, the numbers of pocket portions provided in areas defined respectively between the two gates are each set to an even number, that is, "six" and the number of pocket portions in an area defined between the remaining gates is set to an odd number which is smaller than the numbers of pocket portions in the areas where the even number of pocket portions are provided, the odd number being "five."

In addition, while in the embodiment, the basin is described as being provided in either of the pillar portions of the pocket portion situated in the circumferential center of the area E defined between the gates between which the odd number of pocket portions are provided, the invention is not limited thereto. The basin may be made to be provided in the circumferentially central pillar portion of each of the areas A, B, C and D defined respectively between the gates between which the even number of pocket portions are provided as a preventive measure against short shot of the resin material.

Furthermore, while in the embodiment, the area defined between the gates between which the odd number of pocket portions are provided may be provided in three locations or a larger odd number of locations.

What is claimed is:

1. A supporting construction comprising:
   a ball bearing to which lubricating oil is fed from an axial direction so that the ball bearing is forcibly lubricated and which supports a rotational shaft on a housing, wherein
   the ball bearing comprises:
   an inner ring fitted on the rotational shaft from outside;
   an outer ring fitted in the housing from inside;
   a plurality of balls rotatably provided between the inner ring raceway and the outer ring raceway; and
   a crown resin cage for retaining the balls at equal intervals in a circumferential direction, and
   wherein the crown cage comprises:
   an annular rim portion;
   a plurality of pillar portions disposed on an axial end face of the rim portion at predetermined intervals in the circumferential direction; and
   pockets formed between the pillar portions for retaining the balls rotatably;
   wherein the rim portion of the crown cage is disposed on a flow-in-side from which the lubricating oil flows thereinto such that the pockets are opened on a flow-out side of the balls.

2. The supporting construction according to claim 1, wherein
   raised portions are provided between the adjacent pockets on the crown cage along the circumferential direction so as to project towards one axial end portion of the crown cage, and the raised portions are spaced from the pillar portions in the circumferential direction.

3. The supporting construction according to claim 2, wherein
   a distance between centers of the balls retained in the adjacent pockets is twice or more of a ball diameter.

4. The supporting construction according to claim 2, wherein the raised portions are formed in an arc shape when viewed from the axial direction.

5. The supporting construction according to claim 2, wherein an axial end portion of each of the raised portions is flat.

6. The supporting construction according to claim 2, wherein the raised portions are spaced from the pillar portions in the circumferential direction via spaced portions, and
   an axial length of the raised portions from a bottom of the spaced portions is the same as an axial length of the pillar portions from the bottom of the spaced portions.

7. The supporting construction according to claim 2, wherein a radial thickness of the raised portions is the same as a radial thickness of the pillar portions.

8. A ball bearing comprising:
   an inner ring;
   an outer ring;
   a plurality of balls rotatably provided between the inner ring and the outer ring; and
   a crown cage configured to retain the balls at intervals in a circumferential direction,
   wherein the crown cage comprises:
   an annular rim portion;
   a plurality pairs of pillar portions extending from the rim portion in an axial direction, each of the pairs of pillar portions defining a pocket in which a corresponding one of the balls is retained; and
   a plurality of raised portions extending from the rim portion in the axial direction,
   wherein the raised portions and the pairs of the pillar portions are alternately arranged along the circumferential direction and are spaced from each other in the circumferential direction and
   wherein a distance from a center of one of the balls to a center of a next one of the balls in the circumferential direction is twice or more of a diameter of each of the balls.

9. The ball bearing according to claim 8, wherein the raised portions are formed in an arc shape when viewed from the axial direction.

10. The ball bearing according to claim 8, wherein an axial end portion of each of the raised portions is flat.

11. The ball bearing according to claim 8, wherein the raised portions are spaced from the pillar portions in the circumferential direction via spaced portions, and
    an axial length of the raised portions from a bottom of the spaced portions is the same as an axial length of the pillar portions from the bottom of the spaced portions.

12. The ball bearing according to claim 8, wherein a radial thickness of the raised portions is the same as a radial thickness of the pillar portions.

* * * * *